US010673767B2

(12) United States Patent
Popescu et al.

(10) Patent No.: US 10,673,767 B2
(45) Date of Patent: Jun. 2, 2020

(54) METHODS AND APPARATUS FOR REAL-TIME TRAFFIC STEERING USING REAL-TIME USER MONITORING DATA

(71) Applicant: DYNAMIC NETWORK SERVICES, INC., Redwood Shores, CA (US)

(72) Inventors: Alin Popescu, Hanover, NH (US); Philip Stanhope, Newburyport, MA (US); Arun Mehra, Hanover, NH (US); Stephen Hulshof, Burlington (CA); Brian Premore, West Lebanon, NH (US); Douglas Madory, Lebanon, NH (US); Scott Michael Brazina, Concord, MA (US); Charlie Baker, Pelham, NH (US); Richard Gibson, Milford, NH (US)

(73) Assignee: DYNAMIC NETWORK SERVICES, INC., Redwood Shores, CA (US)

(*) Notice: Subject to any disclaimer, the term of this patent is extended or adjusted under 35 U.S.C. 154(b) by 43 days.

(21) Appl. No.: 15/756,646

(22) PCT Filed: Sep. 6, 2016

(86) PCT No.: PCT/US2016/050429
§ 371 (c)(1),
(2) Date: Mar. 1, 2018

(87) PCT Pub. No.: WO2017/041107
PCT Pub. Date: Mar. 9, 2017

(65) Prior Publication Data
US 2018/0270161 A1    Sep. 20, 2018

Related U.S. Application Data

(60) Provisional application No. 62/214,814, filed on Sep. 4, 2015.

(51) Int. Cl.
*H04L 12/841* (2013.01)
*H04L 12/26* (2006.01)
(Continued)

(52) U.S. Cl.
CPC ........ *H04L 47/283* (2013.01); *H04L 43/0829* (2013.01); *H04L 43/0864* (2013.01);
(Continued)

(58) Field of Classification Search
CPC ..... H04L 47/283; H04L 43/106; H04L 43/10; H04L 43/0829; H04L 43/0864; H04L 45/121; H04L 45/04
See application file for complete search history.

(56) References Cited

U.S. PATENT DOCUMENTS 6,556,541 B1    4/2003 Bare
7,246,045 B1    7/2007 Rappaport et al.
(Continued)

*Primary Examiner* — Min Jung
(74) *Attorney, Agent, or Firm* — Invoke

(57) ABSTRACT

Conventional internet routing is handled using routing protocols such as the Border Gateway Protocol (BGP). However, simple BGP does not account for latency, packet loss, or cost. To address this problem, smart routing systems that route traffic fast and in a cost-effective manner are implemented. In one approach, smart routing systems measure, compare, and analyze round-trip latencies and other metrics between a customer premises and one or more endpoints. Optimal inbound and outbound transit providers are selected for each endpoint based on these measurements. Other smart routing systems collect and analyze Real User Monitoring (RUM) data to predict latency performance of different content origins for serving data to a particular client based on the client's IP address and the content origins' IP addresses, which are ranked by performance. These rankings are used to steer traffic along lower latency paths by resolving Domain Name System (DNS) queries based on the performance associated with the IP addresses.

20 Claims, 15 Drawing Sheets

(51) Int. Cl.
*H04L 12/727* (2013.01)
*H04L 12/715* (2013.01)
*H04L 29/12* (2006.01)

(52) U.S. Cl.
CPC ............ *H04L 43/10* (2013.01); *H04L 43/106* (2013.01); *H04L 45/04* (2013.01); *H04L 45/121* (2013.01); *H04L 61/1511* (2013.01)

(56) References Cited

U.S. PATENT DOCUMENTS

| | | | |
|---|---|---|---|
| 8,472,324 B1* | 6/2013 | Richardson | H04L 45/42 370/235 |
| 8,600,382 B2 | 12/2013 | Hicks, III | |
| 8,738,766 B1* | 5/2014 | Kazerani | H04L 45/70 709/224 |
| 8,745,177 B1* | 6/2014 | Kazerani | H04L 43/08 370/389 |
| 10,033,628 B2* | 7/2018 | Kazerani | H04L 45/22 |
| 2002/0010798 A1 | 1/2002 | Ben-Shaul et al. | |
| 2003/0088529 A1* | 5/2003 | Klinker | H04L 45/00 706/3 |
| 2006/0227766 A1* | 10/2006 | Mickle | H04L 29/06027 370/356 |
| 2010/0118886 A1 | 5/2010 | Saavedra | |
| 2010/0265956 A1 | 10/2010 | Li | |
| 2011/0141922 A1 | 6/2011 | Kotrla et al. | |
| 2012/0158969 A1 | 6/2012 | Dempsky et al. | |
| 2013/0329584 A1* | 12/2013 | Ghose | H04L 45/586 370/252 |
| 2014/0064100 A1 | 3/2014 | Edwards et al. | |
| 2015/0026334 A1 | 1/2015 | Choi et al. | |

* cited by examiner

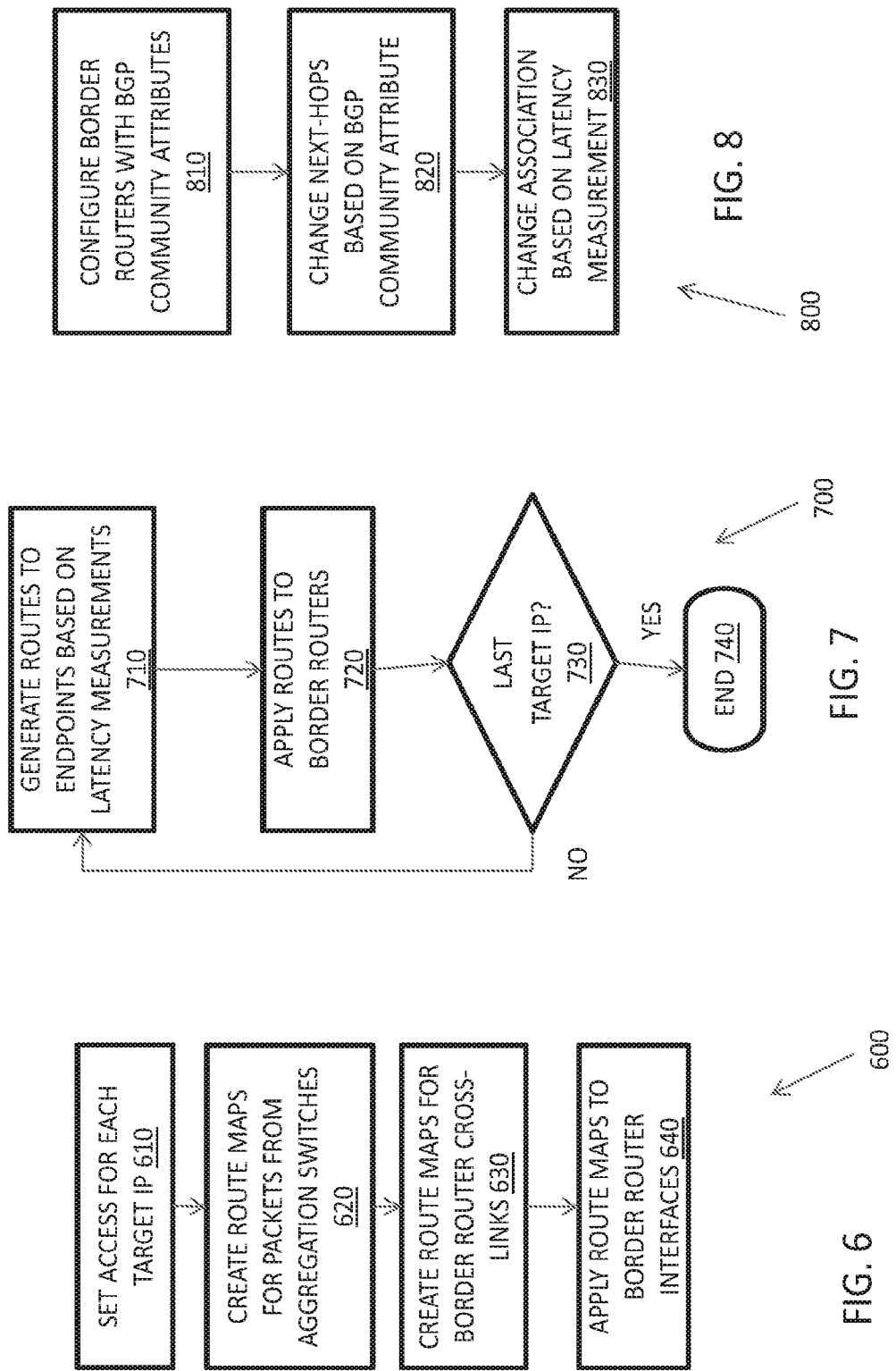

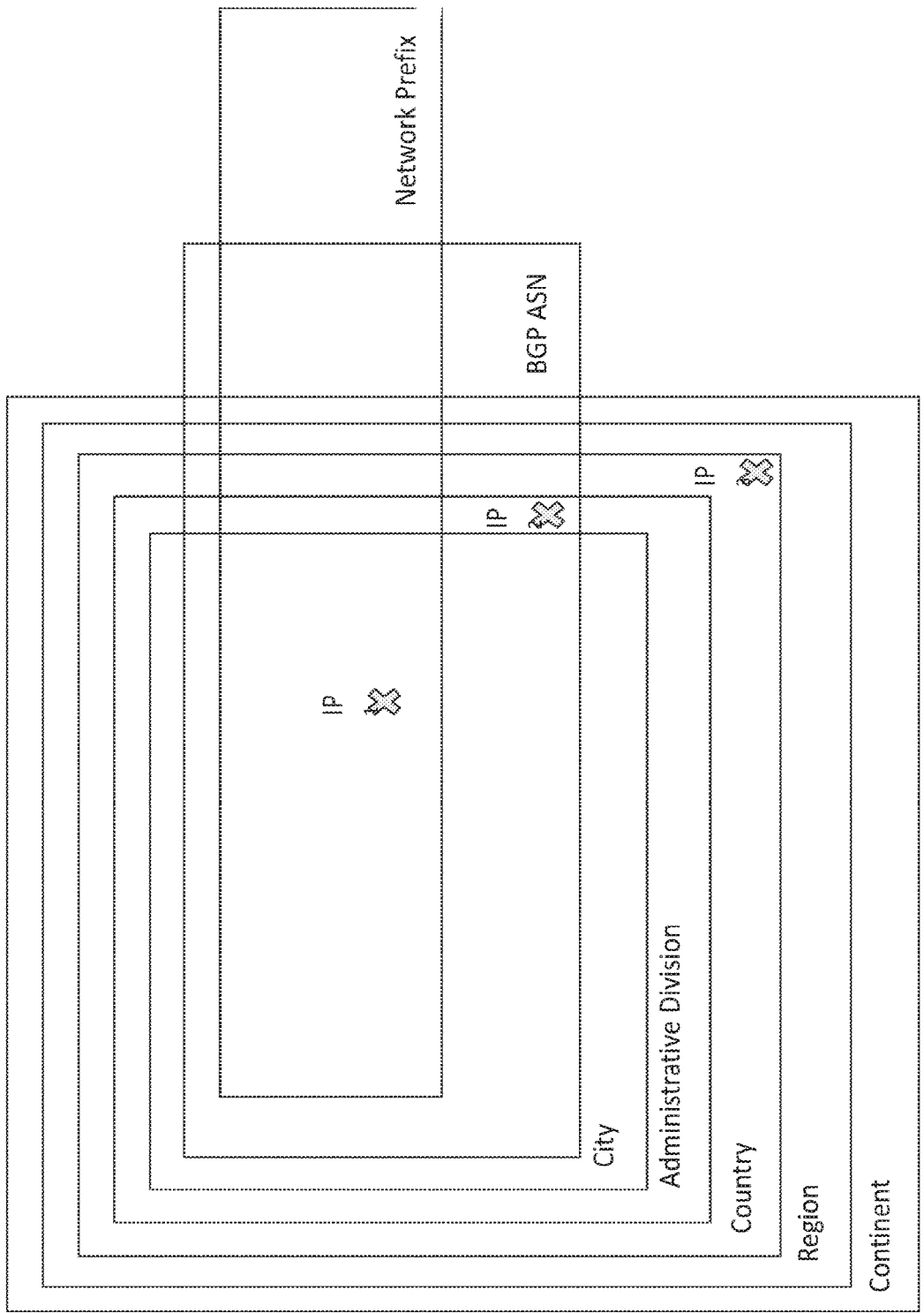

```
 1 Fastly      A (74) |--------------------------
 2 Edgecast    A (71) |------------------------
 3 CDNetworks  A (68) |-----------------------
 4 Akamai      A (67) |----------------------
 5 m.cdn       A (66) |----------------------
 6 Cloudfront  A (63) |---------------------
 7 Cachefly    A (63) |---------------------

8 CDN77       B (40) |-------------
 9 Maxcdn      B (36) |------------
10 Highwinds   B (34) |-----------

11 Level3      C (26) |--------
12 Cloudflare  C (24) |-------

13 Limelight   D (12) |----
```

1520

| % better | Fas | Edg | CDN | Aka | m.c | Clo | Cac | CDN | Max | Hig | Lev | Clo | Lim |
|---|---|---|---|---|---|---|---|---|---|---|---|---|---|
| Fastly      |  0 | 54 | 59 | 54 | 60 | 65 | 62 | 84 | 87 | 88 | 90 | 90 | 93 |
| Edgecast    | 44 |  0 | 54 | 51 | 54 | 60 | 59 | 82 | 86 | 86 | 91 | 91 | 93 |
| CDNetworks  | 39 | 44 |  0 | 46 | 50 | 57 | 53 | 81 | 86 | 86 | 90 | 90 | 91 |
| Akamai      | 43 | 47 | 52 |  0 | 54 | 58 | 56 | 77 | 80 | 80 | 84 | 86 | 92 |
| m.cdn       | 38 | 43 | 48 | 45 |  0 | 55 | 53 | 79 | 83 | 85 | 87 | 88 | 91 |
| Cloudfront  | 33 | 38 | 42 | 40 | 43 |  0 | 48 | 78 | 83 | 84 | 87 | 88 | 91 |
| Cachefly    | 35 | 39 | 45 | 42 | 45 | 50 |  0 | 75 | 82 | 82 | 85 | 88 | 91 |
| CDN77       | 16 | 17 | 18 | 22 | 20 | 21 | 24 |  0 | 58 | 60 | 70 | 72 | 82 |
| Maxcdn      | 13 | 11 | 13 | 20 | 16 | 16 | 18 | 41 |  0 | 54 | 69 | 71 | 87 |
| Highwinds   | 12 | 12 | 13 | 19 | 15 | 16 | 17 | 39 | 44 |  0 | 65 | 68 | 86 |
| Level3      | 10 |  9 | 10 | 15 | 12 | 13 | 14 | 29 | 30 | 34 |  0 | 55 | 78 |
| Cloudflare  | 10 |  9 | 10 | 14 | 12 | 12 | 12 | 27 | 28 | 31 | 44 |  0 | 75 |
| Limelight   |  7 |  6 |  7 |  9 |  8 |  9 |  9 | 17 | 12 | 14 | 22 | 25 |  0 |

METHODS AND APPARATUS FOR REAL-TIME TRAFFIC STEERING USING REAL-TIME USER MONITORING DATA

CROSS-REFERENCE TO RELATED APPLICATION(S)

This application claims the priority benefit, under 35 U.S.C. § 119(e), of U.S. Application No. 62/214,814, entitled "Methods and Apparatus for Real-time Traffic Steering and Real-User Monitoring Data," filed on Sep. 4, 2015, and to International Application No. PCT/US2016/050429, entitled "METHODS AND APPARATUS FOR REAL-TIME TRAFFIC STEERING USING REAL-TIME USER MONITORING DATA", filed on Sep. 6, 2016, the disclosure of which incorporated herein by reference in its entirety.

BACKGROUND

Path selection on the Internet relies heavily on the Border Gateway Protocol (BGP). BGP is a standardized, scalable protocol that allows communication between autonomous systems across the Internet. BGP chooses paths between endpoints using a set of deterministic rules and is classified as a distance-vector routing protocol.

BGP considers neither latency, packet loss, nor cost when selecting a path between a pair of endpoints. As a result, in some circuits, latency can be unacceptably low. In others, there can be high levels of packet loss which can render communication less efficient and effectively increase latency. Finally, BGP is blind to business considerations that transit providers may care about including cost and preferred transit providers.

Currently, some approaches exist to optimize the first hop in a BGP route. Router-specific solutions include IP-SLA from Cisco and Juniper's RPM solutions. Other approaches are either hardware-specific (Noction) or reside at the level of transit provider (Internap) assess traffic flows globally and modify BGP tables accordingly.

At present, there is no holistic or comprehensive solution that is relatively router independent and can integrate an unlimited number of inputs to help determine path choice. Moreover, no solution currently considers or controls return path without having assets on target servers.

The Domain Name System (DNS) can map a logical endpoint/address in Internet Protocol (IP) space from a text-based domain name. When a target needs to be reached, there are methods that allow choice of target based on source geolocation.

However, due to the vagaries of the Internet, target availability from different sources can vary: servers can be overwhelmed, paths can be congested or unavailable. Thus, methods must be in place to determine best target location for a given user or market, in real-time.

SUMMARY

The present technology addresses problems associated with path selection and target choice determination for routing on the internet, among other problems. Embodiments of this technology includes methods and apparatus for directing traffic from a customer premises to an Internet Protocol (IP) address among a plurality of transit providers. The system includes a collector device at the customer premises that measures a first latency to the IP address via a first transit provider in the plurality of transit providers and a second latency from the collector device to the IP address via a second transit provider in the plurality of transit providers. A decision engine coupled to or implemented by the collector device performs a comparison of the first and second latencies and selects the first or second transit provider based on the comparison. A router, switch, or other device directs traffic from the customer premises to the IP address via the selected transit provider.

In some cases, the collector device measures the first latency by transmitting an echo request to the IP address via the first transit provider and receiving an echo reply via the second transit provider. The collector device may also measure the first latency by transmitting an echo request to the IP address via a first interface of a border router coupled to the first transit provider and receiving an echo reply via a second interface of the border router. The collector device can measure the first latency via a first border router coupled to the first transit provider and measure the second latency via a second border router coupled to the first border router and to the second transit provider. In this case, the router may direct the traffic to the second transit provider via the first border router and the second border router. And the collector device can measure the first latency via a first interface on a border router coupled to the first transit provider and the second transit provider and measure the second latency via a second interface on the border router. In this case, the router may direct the traffic to the second transit provider via the first border router and the second border router.

The decision engine may perform the comparison of the first latency and the second latency by comparing an inbound latency of the first transit provider to an inbound latency of the second transit provider. The decision engine may also compare an outbound latency of the first transit provider to an outbound latency of the second transit provider.

The decision engine may select the first or second transit provider further based on a cost of the first transit provider and a cost of the second transit provider. The decision engine may also select the first or second transit provider based on a packet loss of the first transit provider and a packet loss of the second transit provider.

The router, switch, or other routing device may direct the traffic to the IP address by associating a host prefix of a packet with a Border Gateway Protocol (BGP) community attribute and directing the packet to the selected transit provider based on the BGP community attribute. The router, switch, or other device may also direct the traffic to the IP address by setting a next hop for traffic destined to the IP address to be a border router coupled to the one of the first transit provider and the second transit provider.

Other embodiments of the present technology include methods and systems for measuring latency between a target IP address and a customer premises containing a first router that announces a first prefix and is connected to a first transit provider and a second router that announces a second prefix and is connected to a second transit provider. A collection server at the customer premises transmits a first echo request from a first IP address having the first prefix to the target IP address via the second router and the second transit provider. The first echo request comprises a first timestamp indicating when the first echo request was transmitted by the first IP address. The collection server receives a first echo reply from the target IP address via the first transit provider and the first transit provider. The first echo reply comprises a first timestamp reply indicating when the first echo reply was transmitted by the target IP address. A decision engine coupled to or implemented by the collection server determines a first round-trip latency based on the first timestamp and the first timestamp reply.

In some cases, the collection server also transmits a second echo request from a second IP address at the customer premises to the target IP address via the first router and the first transit provider. This the second echo request comprises a second timestamp indicating when the second echo request was transmitted by the second IP address, which has the second prefix. The collection server receives a second echo reply from the target IP address via the second transit provider and the second transit provider. The second echo reply comprises a second timestamp reply indicating when the second echo reply was transmitted by the target IP address.

In these cases, the decision engine determines a second round-trip latency based on the second timestamp and the second timestamp reply. It may also perform a comparison of the first latency and the second latency and select the first or second transit provider based on the comparison of the first latency and the second latency. A router, switch, or other routing device coupled to the decision engine directs traffic from the customer premises to the IP address via the selected transit provider.

Still other embodiments of the present technology include systems and methods for responding to a Domain Name System (DNS) request. An example method comprises receiving a DNS request from a recursive resolver to resolve a domain that has content stored at each of a plurality of content origins, which may provide content from a content delivery network (CDN) or cloud provider. In response to the DNS request, an authoritative DNS server or other processor selects a set of IP addresses from a hierarchy of IP addresses. This set of IP addresses contains the IP address of the recursive resolver and at least a predetermined number of samples. The authoritative DNS server selects a content origin from the plurality of content origins based (i) on the set of IP addresses and (ii) a ranking of content origins in the plurality of content origins associated with the set of IP addresses. The authoritative DNS server sends an IP address of the selected content origin to the recursive resolver.

Yet another embodiment of the present technology includes a method of monitoring a download by a client in real time. In one example, software (executable code) executed by the client causes the client to identify an IP address of a recursive resolver in a plurality of recursive resolvers used to resolve a Domain Name System (DNS) request for a content delivery network (CDN). The client measures a resolution time for resolving the DNS request, identifies a uniform resource locator (URL) of the CDN returned by the recursive resolver in response to the DNS request, and measures a download time for downloading content from the content origin to the client. The client may download and execute this software in response to a request for the content from the client.

The client may measure identify the recursive resolver's IP address, measure the DNS resolution time, identify the URL, and measure the download time for downloads from each of a plurality of CDNs. The client or another processor (e.g., an authoritative DNS server) may perform a comparison of the resolution times and the download times for the plurality of CDNs. For instance, the CDNs may be ranked for each recursive resolver based on the resolution times and the download times for that recursive resolver. The recursive resolver may use this comparison to respond to a subsequent DNS request.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 6 is a flow diagram depicting a process for creating and applying route maps to border router interfaces for latency and packet loss monitoring.

FIG. 7 is a flow diagram depicting policy-based static routing to steer traffic based on latency measurements.

FIG. 8 is a flow diagram depicting automated overwriting to steer traffic based on latency measurements.

FIGS. 14A and 14B show Venn diagrams that illustrate different hierarchies for choosing TYLIPS data to resolve DNS requests.

FIG. 15 shows an exemplary rankings for client IP addresses based on RUM data.

DETAILED DESCRIPTION

Smart Routing between Fixed Endpoints Based on Latency, Packet Loss, and Cost

Packets are routed on the internet according to the Border Gateway Protocol (BGP), which uses rules and tables to determine the "next hop" on a packet's route to a given destination. Unfortunately, simple BGP does not account for latency, packet loss, or cost when routing packets. This can result in sub-optimal routing for applications where low latency is desirable, such as real-time bidding for internet advertising inventory sold on a per-impression basis. With real-time bidding, advertising buyers bid on an impression triggered by a user visiting a publisher's site. If a buyer wins the auction, the buyer's ad is instantly displayed on the publisher's site. Because the auction happens in real-time in response to the user's visit to the publisher's site, it lasts for a very short time, so bidding quickly is imperative. If a buyer's bid doesn't reach the auctioneer until after the auction is over (e.g., due to latency in transmission of the bid from the buyer to the auctioneer), then the buyer is guaranteed to lose the auction.

Fortunately, the smart routing systems and methods disclosed herein can measure latency between two endpoints (e.g., the buyer's IP address and the auctioneer's IP address) and select the lowest latency route between those endpoints. In many cases, these routes are provided by different transit providers, and a decision engine or smart route transmit the packet to the destination IP address via the transit provider offering the route with the lowest available latency. In some cases, the decision engine may select the transit provider based on a user-configurable, weighted combination of latency and other factors, such as cost and packet loss for each transit provider. This intelligent choice of transit providers, effectively overriding BGP policy. As the transit providers' relative latencies, packet losses, and costs change, the decision engine re-routes traffic accordingly by selecting a "best" path at a given time.

While other approaches have optimized outbound paths, they are typically either router-specific or generalized in terms of outbound targets. The approach disclosed herein can be implemented as a software layer that is router-independent and is tailored to specific targets or endpoints. Unlike conventional approaches, the inventive processes can also account for varying inbound flows and optimization of the penultimate inbound step.

Smart Routing System

Figure 1B:
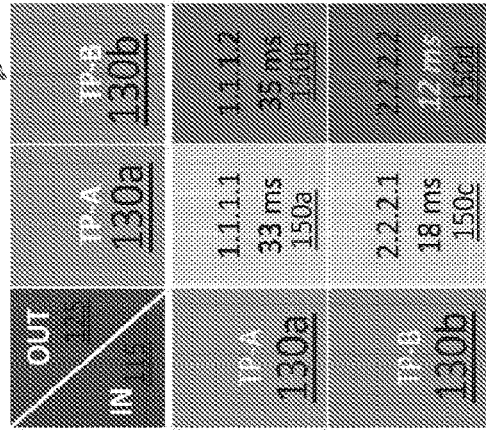
FIG. 1B is a matrix comparison of latencies for the different inbound and outbound paths shown in FIG. 1A.
Figure 1A:
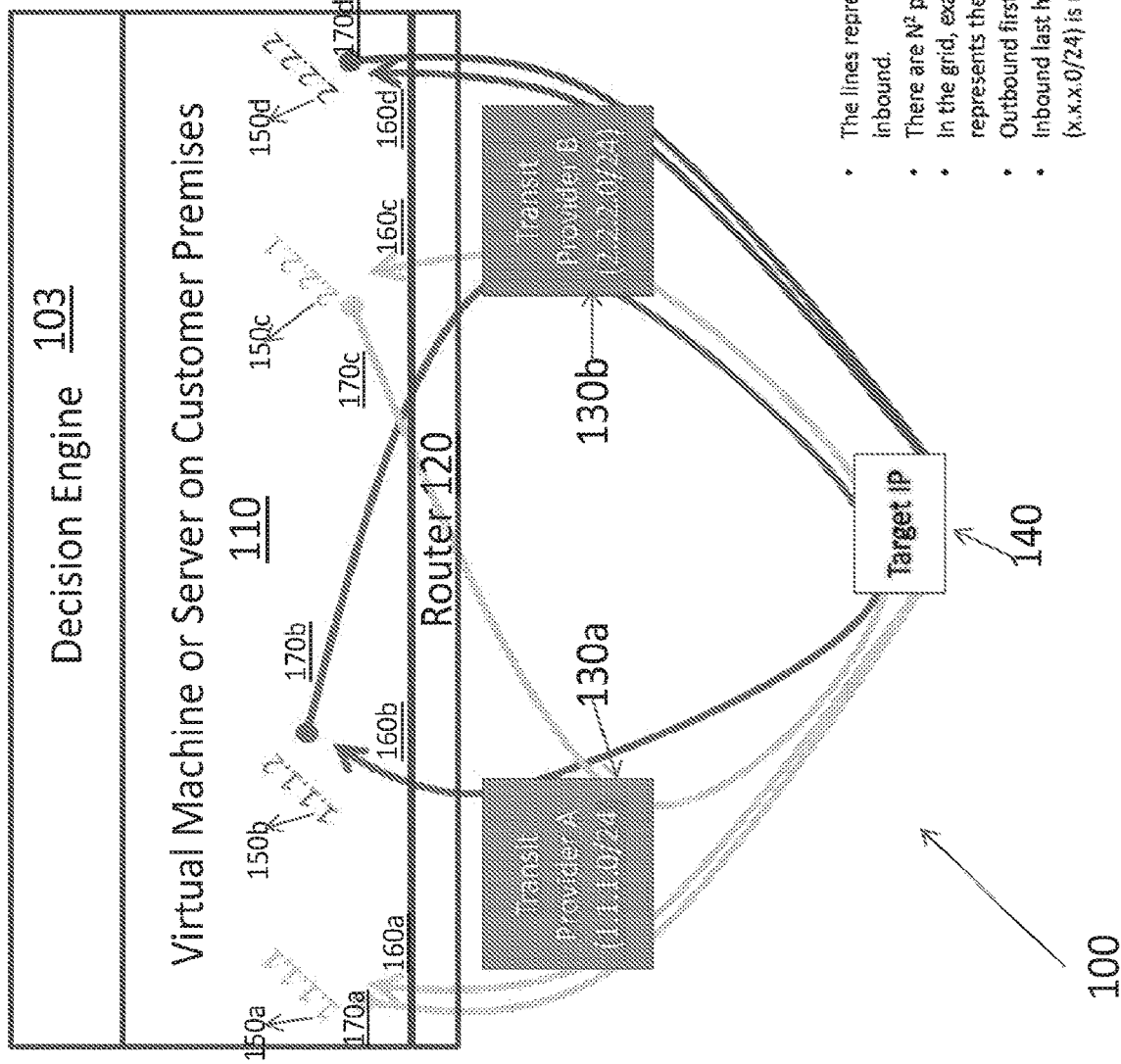
FIG. 1A show a system that monitors and measures latencies along inbound and outbound paths provided by different transit providers between a customer premises and a target Internet Protocol (IP) address.

FIG. 1A is a schematic illustration of a system 100 that monitors and measures latency and packet loss between a virtual machine or server 110 at a customer premises 101 (e.g., a buyer in a real-time bidding process) and one or more target IP addresses 140 (e.g., an auctioneer or publisher site). The system monitors these parameters along inbound paths 160a-160d (collectively, inflows or inbound paths 160) and outbound paths 170a-170d (collectively, outflows or outbound paths 170) and routes traffic among different paths accordingly. In this example, the server 110 is coupled to a router 120, which in turn routes traffic to the target IP address 140 via transit providers 130a and 130b (collectively, transit providers 130). The system 100 also comprises a decision engine 103 coupled to or implemented by the virtual machine/server 110. The decision engine 103 selects a transit provider 130 for carrying traffic between the customer premises 101 and the target IP address 140 based on the latency and packet loss performance of the transit providers 130 measured by the virtual machine 110.

The customer premises 101 comprise one or more virtual machines or servers 110 that are assigned several origination IP addresses 150a-150d (collectively, origination IP addresses 150). Each of these origination IP addresses 150 is used to measure the latency and packet loss of a unique inbound/outbound path pair provided by the transit providers 130. Each transit provider 130 provides both an inbound path 160 and an outbound path 170, so if there are N transit providers 130 that connect the customer premises 101 to the target IP address 140, then the virtual machine 110 is assigned $N^2$ different origination IP addresses 150. In other words, the selected origination IP addresses 150 represent the total number of unique round-trip paths between the customer premises 101 and the target IP address 140 via the transit providers 130.

If the customer premises 101 is large enough, it may announce one or more unique host prefixes. In an IPv4 system, each unique routing prefix may be a "/24," i.e., a routing prefix with 24 bits allocated for the network prefix and 8 bits reserved for host addressing. A /24 is the smallest prefix that BGP will route to. Packets from originating IP addresses 150 that correspond to unique /24s are channeled through respective transit providers 130 as shown in FIG. 1A. A unique /24 for each transit provider 130 is determined by identifying the smallest prefix BGP will route via that transit provider 130. In this example, originating IP addresses 150a and 150b (1.1.1.1 and 1.1.1.2) correspond to the /24 announced behind transit provider 130a (1.1.1.0/24), and originating IP addresses 150c and 150d (2.2.2.1 and 2.2.2.2) correspond to the /24 announced behind transit provider 130b (2.2.2.0/24).

The router 120 routes traffic to the target IP address 140 through the transit providers 130 according to the BGP tables that it stores on its internal memory. These BGP tables are used to assign the originating IP addresses 150 to the virtual machine 110 for probing the time-varying latency and packet loss of each transit provider 130 as described above. And as described below, these BGP tables can be overridden or modified by the decision engine 130 to force traffic through a given transit provider 130 depending on a weighted combination of latency, packet-loss, and cost for the target IP 140.

The inbound paths 160 and outbound paths 170 connect the origination IP addresses 150 and the target IP address 140 via the transit providers 130. Packets travelling along the inbound paths 160 are routed through the transit providers 130 depending on the origination IP addresses 150 from which they originate. In this example, packets on inbound paths 160a and 160b are routed through transit provider 130a while packets on inbound paths 160c and 160d are routed through transit provider 130b. Packets on outbound path 170a, which connects originating IP address 150a and the target IP address 140, are channeled through transit path 130a. And packets on outbound path 170b, which connects originating IP address 150b and the target IP 140, are channeled through transit provider 130b. Similarly, the outbound paths 170c and 170d that connect from IP addresses 150c and 150d, respectively, to the target IP address 140 are channeled through transit providers 130a and 130b, respectively.

The decision engine 103 compares latency, packet loss, and/or cost for the transit providers 130 and implements smart routing based on these comparisons as described in greater detail below. The decision engine 103 modifies or overrides the BGP policy to force traffic through the transit provider 130 that provides the fastest, most cost effective route to the target IP address 140. The decision engine 103 can be implemented as a software layer that is router-independent and is tailored to the target IP address 140. In some embodiments, the decision engine 103 can be included in the server 110. In other embodiments, the decision engine 103 can be included in the router 120. It can also be implement on another processor.

FIG. 1B illustrates a matrix 105 representing the latencies associated with transmitting and receiving packets via the transit providers 130 shown in FIG. 1A. The matrix 105 lists the inbound latency 115 and the outbound latency 125 to the target IP 140 through transit providers 130. These latencies 115, 125 can be summed and compared to identify the lowest latency round-trip path between the customer premises 101 and the target IP address 140.

In this example, matrix 105 includes round-trip latency measurements for every combination of outbound paths 170 to and inbound paths 160 from the target IP 140 via transit providers 130a and 130b. Since there are two transit providers 130, the total number of paths in the matrix 105 is $2^2=4$. In this example, the matrix 105 shows the inflow and outflow latencies for each of the origination IP addresses 150; these latencies map uniquely to different inbound and outbound paths as explained above and shown in FIG. 1A. Comparing the round-trip latencies in the matrix 105 shows that packet transmission between the customer premises 101 and the target IP address 140 via transit provider 130b gives the lowest latency (12 ms). Based on this latency measurement, the inbound last hop to transit provider 130b is set by the BGP and the outbound first hop to transit provider 130b is controlled by policy based routing.

Although the matrix 105 in FIG. 1B shows only latency measurements, those of ordinary skill in the art will readily understand that it may include other measurements in addition to or instead of latency measurements. For instance, the matrix may also include packet loss, cost, or a weighted combination of latency, packet loss, and cost. Similarly, the matrix 105 can be extended to any number of transit providers and target IP addresses.

Measuring Latency and Steering between Endpoints

Figure 2:
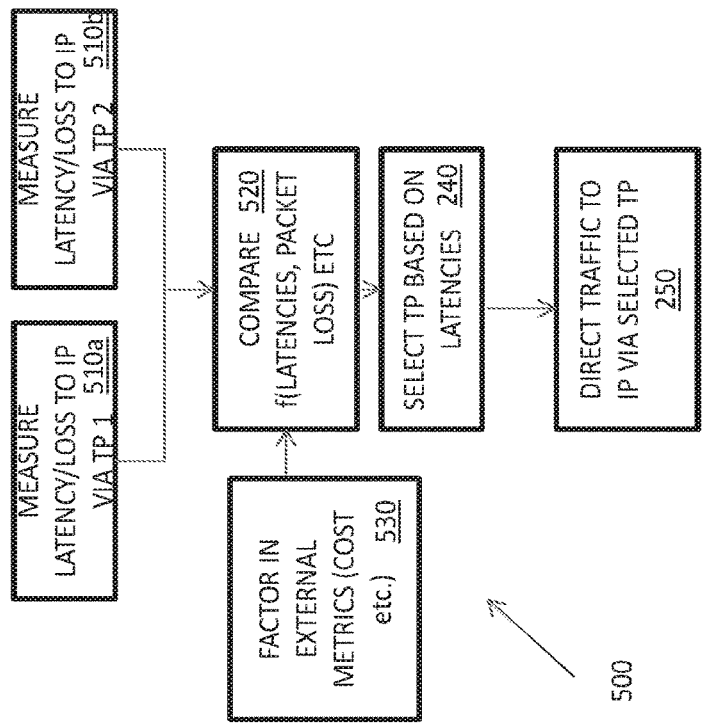
FIG. 2 shows a process for steering traffic to an endpoint via by selecting a transit provider based on latency measurements.

FIG. 2 is a flow diagram showing a process 200 for routing traffic via a selected transit provider based on latency measurements. This process 200 can be implemented using the system 100 illustrated in FIG. 1A or any other suitable system or network, including those shown in FIGS. 5A-5C. The process 200 involves measuring latency for a single target IP address via different transit providers. For example, given two transit providers—transit provider 1 and transit provider 2, the latency to the target IP via each transit provider is measured in step 210. In step 220, the measured latencies are compared to select the transit provider with the lowest latency to the target IP address. In some cases, external metrics such as initial cost and packet loss are factored into the comparison as well (230). Following the comparison (220), an appropriate transit provider for the target IP address is selected in step 240. Traffic is steered via the selected transit provider (250). Outbound first hops are controlled by policy-based routing using route maps or by steering using BGP attributes associated with transit providers.

Although FIG. 2 illustrates only two transit providers and a single target IP address, those of ordinary skill in the art will readily appreciate that more this process may be applied to more than two transit providers and more than one IP address. For instance, it may applied to each of several IP addresses in parallel, possibly for different numbers of transit providers to each IP address (e.g., two transit providers to a first IP address, five providers to a second IP address, and so on). A single transit provider may serve multiple IP addresses, but does not need to serve every IP address.

Measuring Latency by Pinging Endpoints (Target/Destination IP Addresses)

Figure 3:
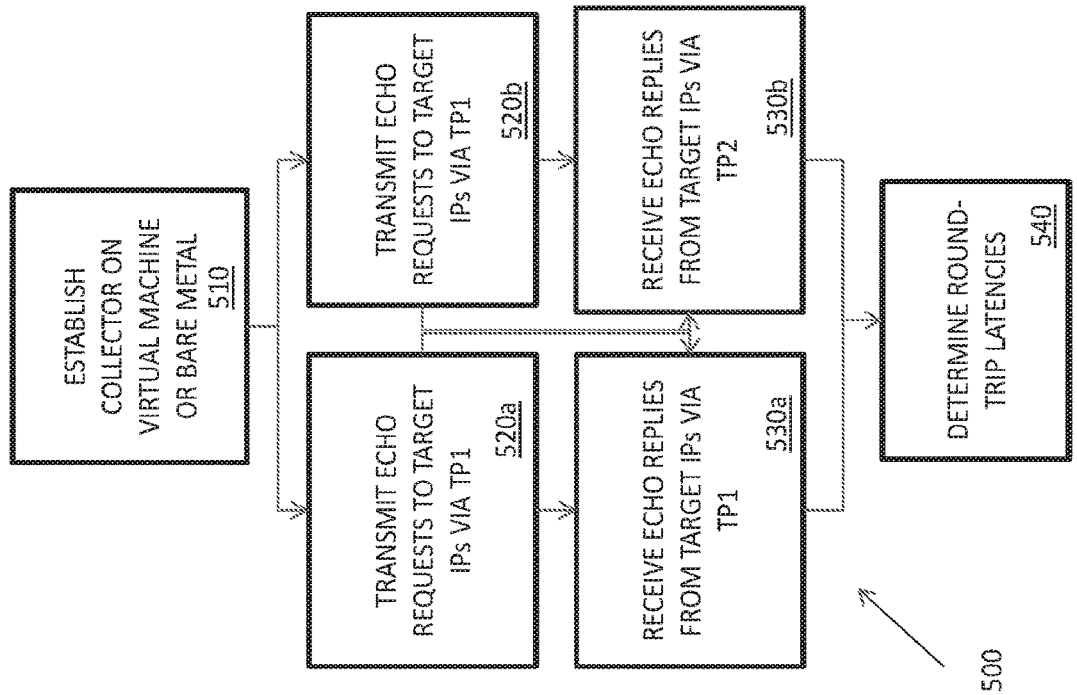
FIG. 3 shows a process for measuring round trip latencies between a pair of IP addresses via different transit providers.

FIG. 3 is a flow diagram illustrating a process 300 for collecting inbound and outbound latency data, e.g., using the virtual machine 110 shown in FIG. 1A. A collector (collection server) is established on a virtual machine or bare metal on the customer premises 310. The collector collects latency data by pinging each target IP address on a list target IP addresses provided by the customer. These pings may originate at different source IP addresses to probe different forward and return paths as described above.

Pinging occurs as follows. In step 320, the collector sends an Internet Control Message Protocol (ICMP) echo request packet to each target IP address via each transit provider being monitored. For example, given a network with two transit providers TP1 and TP2, the collector sends repeated echo request packets to a first target IP address from a first source IP address via TP1 and from a second source IP address via TP2. In step 330, the target IP address responds to the echo request packets by sending echo reply packets. Each echo reply packet is routed to the apparent source IP address of the corresponding echo request packet. As explained above, the apparent source IP address may be different than the actual source IP address if the route maps applied to the border router interfaces forces the corresponding echo request to the target IP address via a transit provider that announces a different prefix.

In step 340, the collector determines the latency associated with the round-trip measurements based on the timestamps (e.g., the echo request time and echo reply time) in the echo reply packets. As well understood in the art, each echo request message may include a timestamp indicating the time of transmission and a sequence number. Likewise, each echo reply message may include the time of transmission and a sequence number. Each echo reply also includes the timestamp and sequence number of the corresponding echo request message. The difference between the echo request and echo reply transmission times indicated by the timestamps in the echo reply indicate the latency, which may be recorded and stored in a database or other memory storage.

The collector may also assess packet loss based on the ratio of Echo Request to Echo Replies for each transit provider or the timeliness of the Echo Replies. For instance, if the collector sends ten Echo Requests via a first transit provider, but only receives eight Echo Replies, the collector may determine that the first transit provider has a packet loss rate of 20%. Packet loss can be correlated among transit providers to assess the packet losses of inbound and outbound paths, much like round-trip latency measurements via different transit provider can be used to assess the latencies of inbound and outbound paths.

Determining Optimal Paths Based on Metric Comparisons

Figure 4:
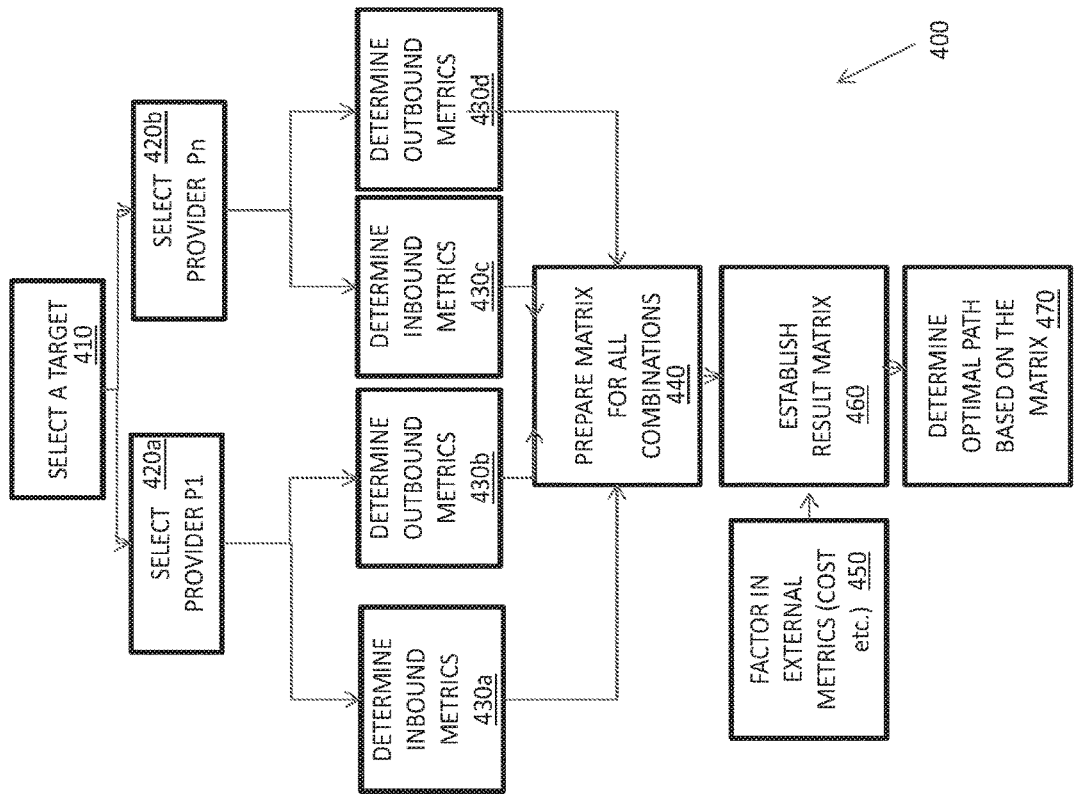
FIG. 4 shows a process for selecting inbound and outbound transit providers based on round-trip latencies between a pair of IP addresses.

FIG. 4 is a flow diagram illustrating a process 400 implemented by the decision engine 103 shown in FIG. 1A for comparing various metrics for different transit providers connecting a customer premise and a target IP address. In step 410, the decision engine selects a target IP address, e.g., in response to user input. In steps 420a and 420b, the decision engine identifies the transit providers that the customer premises to the target IP address selected in step 410. In steps 430a-430d, the decision engine determines the inbound and outbound metrics to the selected target IP through the transit providers identified in step 420. The inbound and outbound metrics include, but are not limited to latency, cost, and packet loss. Latency and packet loss may be determined by pinging the target IP address as described above with respect to FIG. 3. And cost information may be provided by the customer.

In step 440, the decision engine prepares a matrix, e.g., as shown in FIG. 1B, or other representation of every combination of inbound and outbound paths. For example, if the number of transit providers is N then the total numbers of paths obtained by combination is $N^2$. If N is very large, the decision engine may sample the latencies, packet losses, and/or combinations thereof to reduce the number of measurements and/or combinations for faster computation. In step 450, the decision engine factors in external metrics, such as the cost associated with routing packets via each transit provider. Factoring in the external metrics, the inbound and outbound metrics are consolidated in a matrix or other representation of preferability scores (weighted combination of latency, cost, and/or packet loss) for each inbound/outbound transit provider combination in step 460. In step 470, the decision engine identifies an optimal path based on a comparison of the preferability scores in the matrix.

Monitoring and Steering Traffic via Multiple Border Routers

Figure 5A:
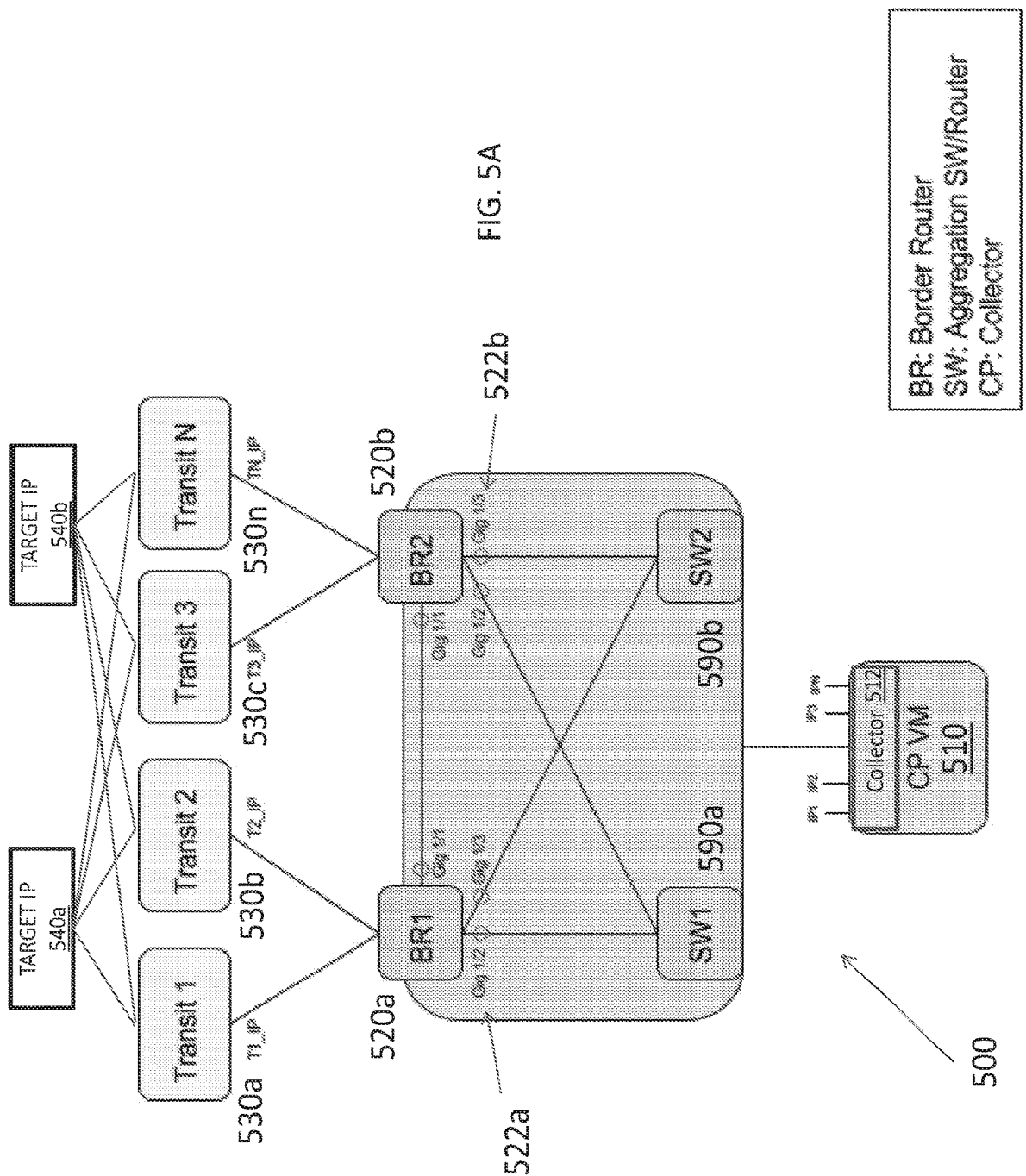
FIG. 5A illustrates a network in which a route-map is applied to border router interfaces for monitoring latency between a collector and several target IP addresses.
Figure 5B:
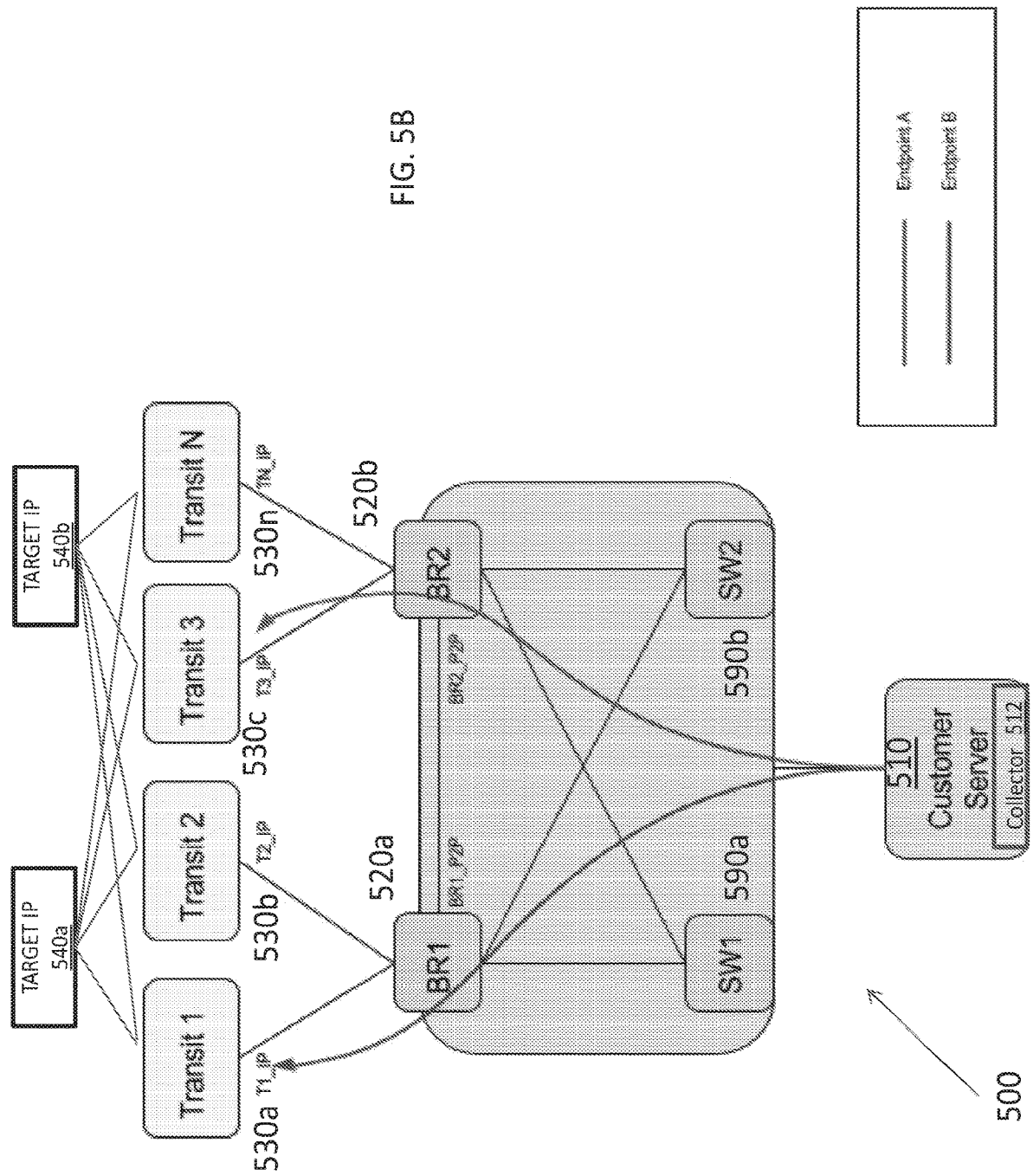
FIG. 5B illustrates steering traffic in a network, manually, between the collector and several target IP addresses via static routes.
Figure 5C:
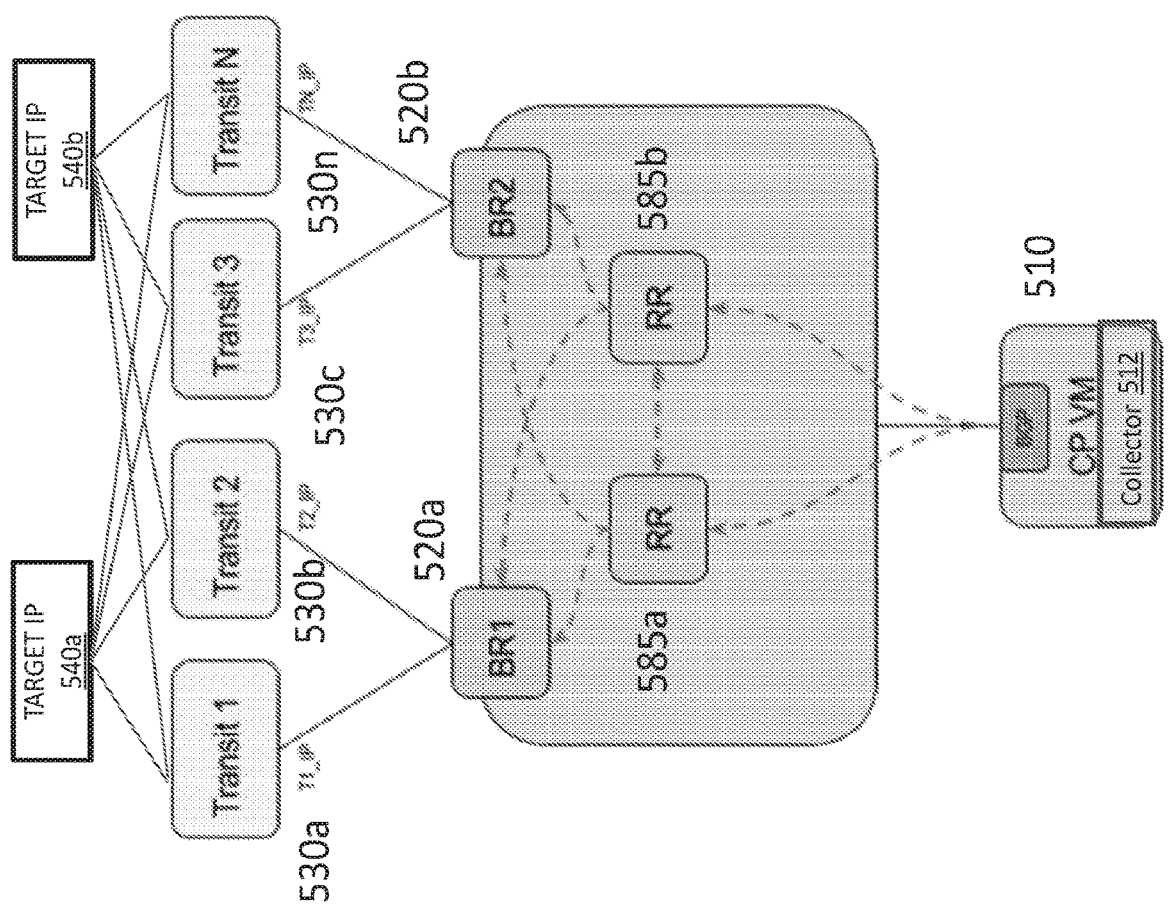
FIG. 5C illustrates steering traffic by dynamically associating BGP community attributes with different transit providers based on the measured latencies of the transit providers.

FIGS. 5A-5C depicts a network 500 that measures latency and packet loss between a customer premises virtual machine 510 and one or more target/destination IP addresses 540a and 540b (collectively, target IP addresses 540). The virtual machine 510, which includes a collector 512 that stores a list of the target IP addresses for monitoring and steering, is coupled to aggregation routers 590a and 590b (collectively, aggregation routers 590). Another layer of routing interface is added using border routers 520a and 520b (collectively, 520) coupled to the aggregation routers 590. Border routers 520 route the traffic to other border routers 520 and to transit providers 530a-530n (collectively, 530).

In operation, the collector 512 monitors the latencies and packet losses of transmissions between origination or source IP addresses IP1-IPN to and from the listed target IP addresses 540 as described in greater detail above and below. Again, the collector 512 uses customer-provided, public-facing IP addresses as source points for collecting latency and packet loss data. The list of target IP addresses 540 may be established by asking customer for distinct IP addresses. The custom collector 512 included in the customer virtual machine 510 allows connections to be made in a periodic manner from customer endpoints or target IP addresses.

The virtual machine 510 routes traffic through the aggregation routers 590a (SW1) and 590b (SW2), which use route aggregation methods to generate a specific route. The method organizes a network 500 by replacing multiple routes with a single and general route. This reduces the number of routers and minimizes the overhead related to routing protocols. The border routers 520a (BR1) and 520b (BR2) coupled to the aggregation routers 590 are deployed to perform ingress and egress filtering. Border routers 520 establish a connection between backbone networks and one or more Open Shortest Path First (OSPF) areas.

The aggregation routers 590 route traffic to and from the target IP address(es) 540 through an appropriate transit provider 530 based on the latency and packet loss measurements made by the customer premise virtual machine 510 and collector 512. As described above and below, the appropriate transit provider 530 for a specific target IP address 540 is selected by analyzing and comparing the monitored metrics, such as latency, cost, and packet loss, for the transit providers 130. The routing can be implemented using route maps or by associating BGP attributes with transit providers based on the analyzed metrics as described below.

Monitoring Latency and Packet Loss

In FIG. 5A, the collector 512 monitors latency and packet loss to different target IP addresses via the transit providers 530. It does this by using policy-based routing to match each IP address configured on the collector 512 and route packets for each IP address out its associated transit provider 530. A route map is applied to each of the ingress interfaces 522a and 522b on the border routers 520. (The ingress interfaces 522a and 522b are also labeled gig 1/1, gig 1/2, and gig 1/3 in FIG. 5A.) These route maps use access lists to match the IP addresses from the collection server 512 and set the next-hop for transiting packets to the appropriate transit provider 530 or adjacent border router 520. The route maps applied to each border router interface facing the aggregation routers 590 cover all IP addresses and force outbound Echo Request packets to either the transit provider coupled to the corresponding border router 530 or to a neighboring border router 530. By forcing Echo Request packets out different transit providers 530, the collector 512 can measure latency along each combination of inbound and outbound paths available between it and the target IP address 540.

FIG. 6 and the following pseudo-code illustrate an example of a process 600 to configure and apply a route map for monitoring latency and packet loss between a first IP address (e.g., at the customer premises) and a second IP address (e.g., a target IP address). In step 610, the customer sets the access for each target IP address on the collector 512:

| Border Router 520a Configuration | Border Router 520b Configuration |
| --- | --- |
| access-list 1 permit <IP_1> | access-list 1 permit <IP_1> |
| access-list 2 permit <IP_2> | access-list 2 permit <IP_2> |
| access-list 3 permit <IP_3> | access-list 3 permit <IP_3> |
| access-list n permit <IP_N> | access-list n permit <IP_N> |

In step 620, the customer creates a route map (COLLECTOR_SW) to look for each destination IP address in the packets coming from the aggregation switches 590:

| Border Router 520a Configuration | Border Router 520b Configuration |
| --- | --- |
| route-map COLLECTOR_SW permit 10<br>match ip address 1<br>set ip next-hop <T1_IP> | route-map COLLECTOR_SW permit 10<br>match ip address 1<br>set ip next-hop<BR1_P2P> |
| ! | ! |

| Border Router 520a Configuration | Border Router 520b Configuration |
| --- | --- |
| route-map COLLECTOR_SW permit 20<br>  match ip address 2<br>  set ip next-hop <T2_IP><br>!<br>route-map COLLECTOR_SW permit 30<br>  match ip address 3<br>  set ip next-hop<BR2_P2P><br>!<br>route-map COLLECTOR_SW permit 40<br>  match ip address 4<br>  set ip next-hop<BR2_P2P><br>! | route-map COLLECTOR_SW permit 20<br>  match ip address 2<br>  set ip next-hop<BR1_P2P><br>!<br>route-map COLLECTOR_SW permit 30<br>  match ip address 3<br>  set ip next-hop <T3_IP><br>!<br>route-map COLLECTOR_SW permit 40<br>  match ip address 4<br>  set ip next-hop<TN_IP><br>! |

In step 630, the customer creates a route map (COLLECTOR_BR1 and COLLECTOR_BR2) for the cross-link between the border routers 530:

| Border Router 520a Configuration | Border Router 520b Configuration |
| --- | --- |
| route-map COLLECTOR_BR1 permit 10<br>  match ip address 1<br>  set ip next-hop <T1_IP><br>!<br>route-map COLLECTOR_BR1 permit 20<br>  match ip address 2<br>  set ip next-hop <T2_IP><br>! | route-map COLLECTOR_BR2 permit 10<br>  match ip address 3<br>  set ip next-hop <T3_IP><br>!<br>route-map COLLECTOR_BR2 permit 20<br>  match ip address N<br>  set ip next-hop<TN_IP><br>! |

In step 640, the customer applies the COLLECTOR_SW route map to each interface 522 (gig 1/1 and gig 1/2) facing the aggregation switches 590 and cross-links the interfaces 522 (gig 1/3) facing the border routers 520 with the COLLECTOR_BR1 and COLLECTOR_BR2 route maps:

| Border Router 520a Configuration | Border Router 520b Configuration |
| --- | --- |
| interface gig 1/1<br>  ip policy route-map<br>  COLLECTOR_BR1<br>!<br>interface gig 1/2<br>  ip policy route-map<br>COLLECTOR_SW<br>!<br>interface gig 1/3<br>  ip policy route-map<br>COLLECTOR_SW<br>! | interface gig 1/1<br>  ip policy route-map<br>  COLLECTOR_BR2<br>!<br>interface gig 1/2<br>  ip policy route-map<br>COLLECTOR_SW<br>!<br>interface gig 1/3<br>  ip policy route-map<br>COLLECTOR_SW<br>! |

If each transit provider 530 announces a different /24 as described above with respect to FIG. 1A, the collection server 512 can test N outflows by N inflows. A packet (e.g., an Echo Request packet for measuring latency) originating from a source IP address belonging to the prefix announced by transit provider 530a is channeled to its destination IP address through each transit provider 530 as described above. But a return packet (e.g., an Echo Reply packet in response to the Echo Request) from the destination IP address transits back to the source IP address through transit provider 530a. Measuring each inflow/outflow combination between a given source and destination IP addresses yields a matrix of inflow and outflow latency performance (e.g., as shown in FIG. 1B). Comparing the latency measurements makes it possible to pick the "best" (e.g., lowest latency) combination of inflow and outflow to a given destination IP address at a given time.

Best Transit Decision Engine for Determining a Path to an Endpoint

The virtual machine 510, collection server 512, or separate processor may implement a decision engine (not shown) that executes the following pseudocode to determine a desired path for routing traffic to a give target IP address:

poll the Application Program Interface (API) for data at a regular interval
for each target IP address t:
  get all recent measurements (by time or by count) for t
  for each transit provider P:
    compute a preferability score for t based on latency, packet
    loss, and customer-configured cost of using P
  decide whether to recommend a routing switch for t In deciding whether to recommend a switch, the decision engine checks which transit provider 530 has the highest preferability score for the target IP address and compares that score with the preferability score of the current transit provider 530 for that target IP address. The decision engine "knows" the current provider either by maintaining a record of the routing state (e.g., the last recommendation) or by querying the customer's system for its routing configuration. The decision engine may impose a limit on the frequency with which it recommends switching transit providers 530 to prevent undesired oscillations between transit providers 530. Similarly, the collector 512 may adjust the frequency of its latency and packet measurements to prevent adversely affecting routing performance (e.g., by creating congestion with too many Echo Requests and Echo Replies).

Static Routes (Manual Traffic Steering)

FIG. 5B shows how the network 500 steers traffic, manually, via static routes set according to the recommendations of the decision engine. The appropriate transit provider 530 is determined for each endpoint based on the preferability score, which is a customer-configured weighted combination of latency, cost, and packet loss. The customer server 510 overrides the BGP policy by applying static route for each endpoint. For example, if transit provider 530c provides the path with the lowest preferability score for traffic to endpoint A, the BGP policy is overridden and traffic for endpoint A is steered through transit provider 530c. Similarly, if transit provider 530a provides the path with the lowest preferability score for traffic to endpoint B, the BGP policy is overridden and traffic for endpoint B is steered through transit provider 530a.

FIG. 7 and the following pseudo code illustrate a process 700 for (manually) steering traffic to two target endpoints. In step 710, the decision engine generates static routes to each endpoint (target IP address 540) monitored by the collector 512. In step 720, the decision engine applies the static routes for endpoints A and B to each of the border routers 520:

| Example IOS route-map |
|---|
| ip prefix-list slash32 seq 5 permit 0.0.0.0/0 ge 32 |
| route-map TRAFFIC_STEERING permit 10 |
|   match ip address prefix-list slash32 |
|   match community <T1_COMMUNITY> |
|   set ip next-hop <T1_P2P> |
|   set community no-export additive |
| route-map TRAFFIC_STEERING permit 20 |
|   match ip address prefix-list slash32 |
|   match community <T2_COMMUNITY> |
|   set ip next-hop <T2_P2P> |
|   set community no-export additive |
| route-map TRAFFIC_STEERING permit 30 |
|   match ip address prefix-list slash32 |
|   match community <T3_COMMUNITY> |
|   set ip next-hop <T3_P2P> |
|   set community no-export additive |

| Border Router 520a Configuration | Border Router 520b Configuration |
|---|---|
| Ip route <endpoint_a> 255.255.255.255 <T1_IP> | ip route <endpoint_a> 255.255.255.255 <BR1_P2P> |
| Ip route <endpoint_b> 255.255.255 255 <BR2_IP> | ip route <endpoint_B> 255.255.255.255 <T3_IP> |

This process 700 may be repeated (steps 730 and 740) for each endpoint pointing to the appropriate transit provider 530 or border router 520. Note that the static routes can be applied to border routers 520 for the endpoints 540 in any order or even simultaneously.

Once applied, the static routing works as follows. If a packet destined for Endpoint A appears at border router 520a, border router 520a routes the packet via transit provider 530a. Similarly, if a packet destined for Endpoint B appears at border router 520b, border router 520b routes the packet to Endpoint B via transit provider 530c. But if a packet destined for Endpoint B appears at border router 520a, border router 520a routes the packet to border router 520b, which in turn routes the packet to Endpoint B via transit provider 530c. Similarly, if a packet destined for Endpoint A appears at border router 520b, border router 520b routes the packet to border router 520a, which in turn routes the packet to Endpoint A via transit provider 530a.

Steer Traffic by Associating BGP Attributes with Transit Providers

Static routes as described above don't scale well and can be unwieldy with respect to configuration and fault management. Fortunately, dynamic steering can be accomplished using a BGP daemon on the collection server 512 at the customer location. This BGP daemon enables the collection server 512 to peer with the customer routers 530 either directly or via one or more route reflector 585a and 585b (collectively, route reflectors 585) as shown in FIG. 5C.

FIG. 8 and the following pseudo-code illustrate a process 800 for dynamically configuring a router to steer traffic for a given IP address via a particular transit provider using the BGP community attribute. Each transit provider 530 is associated with a different BGP community attribute. Each host prefix can be associated with a given transit provider 530 by changing the BGP "community." Once this association is formed, a border router 520 will steer traffic with a given BGP "communities" attribute via the associated transit provider 530, e.g., per the following pseudo code:

The process 800 can be implemented by configuring the border routers 520 with policies that match a unique BGP communities attribute assigned to each transit provider 530 (step 810). Once matched to a given BGP community, each border router 520 changes its corresponding next-hop towards the associated transit provider 530 (step 820). If another transit provider 530 begins offering lower latency to the same endpoint, the BGP daemon changes the associations among the border routers 520 and transit providers 530 by changing the value of the BGP communities attribute for that endpoint. For example, the BGP daemon may apply the following route map on the BGP session:

| Example IOS route-map |
|---|
| router bgp ABCD |
|   <snip> |
|   neighbor <BGP_DAEMON> route-map TRAFFIC_STEERING in |
|   <snip> |

Real-Time User Monitoring for Resolving DNS Queries

Another approach to steering internet data traffic in an optimal manner is by resolving Domain Name System (DNS) queries based on various performance metrics, including latency and cost. This is achieved by collecting and analyzing Real User Monitoring (RUM) data to predict performance for providing content from different content origins to the client and for querying a given authoritative server with a given recursive resolver. The predicted performance can be used to steering the client making the DNS query to a given content origin, which may provide content from a content delivery network (CDN) or cloud provider, and/or to steer a recursive resolver to a given authoritative server. The traffic is steered based on the predicted performance of the content origin with respect to the client's IP address. More specifically, one or more servers collect RUM data for different, processing the RUM data at IP level, aggregating the RUM data across sets of IP addresses, and creating a database for fast access to the aggregated data. The database is then used to steer traffic in an optimal manner.

As understood by those of skill in the art, DNS is a hierarchical distributed naming system for computers, services, or any resource connected to the Internet or a private network. It associates various information with domain names assigned to each of the participating entities. DNS also translates more readily memorized domain names to the numerical Internet Protocol (IP) addresses used to locate and identify computer services and devices with the underlying network protocols.

Authoritative DNS servers, also known as authoritative name servers or authoritatives, respond to queries about the mapping of domain names to numerical IP addresses and also to requests for other resource records (RRs), such as mail exchange (MX) records. To respond to these queries, each authoritative has its own DNS database of DNS records. Common types of records stored in a DNS database include IP addresses (A and AAAA), Simple Mail Transfer Protocol (SMTP) MX records, and name server (NS) records for the corresponding domain A DNS database can also store records for other types of data, including domain name aliases (CNAME) and DNS Security Extension (DNSSEC) records, which can be used to authenticate DNS records.

To add a new domain to the Internet, basic DNS standards call for the domain owner, or registrant, to purchase a domain name from a registrar and specify the names of the authoritative DNS servers used to answer queries for the new domain. The registrant obtains authoritative DNS service from an authoritative DNS provider (such as Dynamic Network Services Inc. of Manchester, N.H.) and configures the records for its domain name (or more precisely, zone) with the authoritative DNS provider. When an end user's machine attempts to access the new domain name, it asks a recursive DNS server, also called a recursive server, recursive resolver, or recursive, to retrieve DNS records for the new domain, most commonly A or AAAA (IPv4 or IPv6 address). These DNS records include the IP address of the content origin that provides the content or other information being requested by the end user. The recursive server locates an authoritative DNS server (also called an authoritative server or simply an authoritative) maintained by the authoritative DNS provider, then queries the authoritative DNS server for the DNS record. The recursive DNS server returns the authoritative DNS server's answers to the end user's machine and may also cache the answers according to their time to live (TTL). The end user's machine then attempts to access the domain using a DNS record provided by the authoritative DNS server.

Conventional recursive and authoritative DNS servers do not account for the latency associated with the packet transmission between the IP address of the content origin for the new domain and the end user's machine (the client). Instead, the authoritative server simply provides IP addresses according to a (static) policy set by the operator of the new domain. As a result, conventional name servers may not steer the client to the content origin offering the lowest latency.

RUM Data Monitoring System

Figure 9:
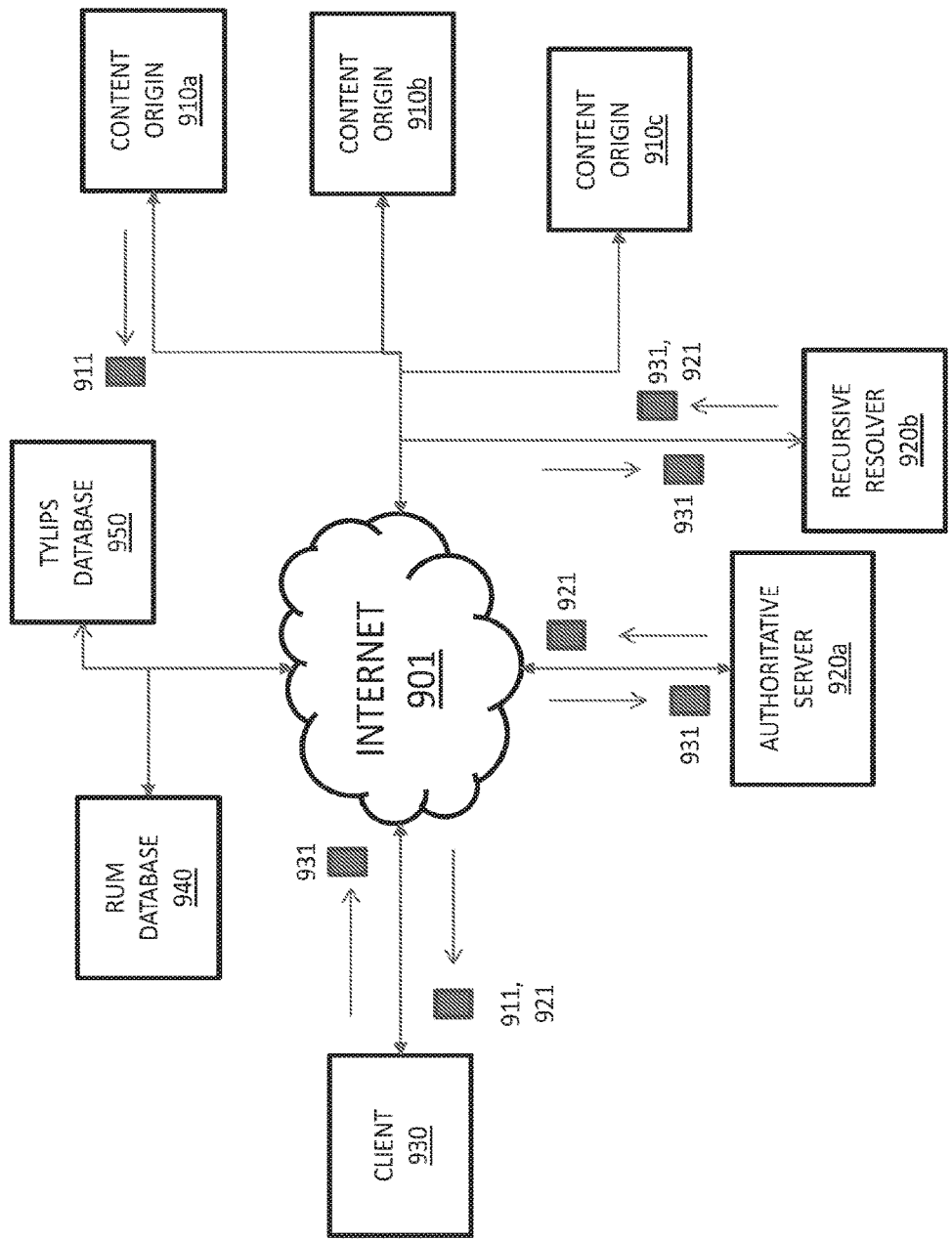
FIG. 9 illustrates a system for collecting Real-time User Monitoring (RUM) data and steering traffic based on RUM data and TYped Labeled IP Set (TYLIPS) data.

FIG. 9 shows a system 900 that monitors RUM data and uses RUM data to resolve DNS requests based on latency and other factors. The system 900 includes a client 930 that communicates with content origins 910a-910c (collectively, content origins 910) and authoritative server 920a and recursive resolver 920b (collectively, authoritative DNS server recursive resolver 920) via the internet 901 or another packet-switched network. The system 900 also includes a RUM database 940, which stores RUM data, and another database 950, which stores Typed Labeled IP Sets (TYLIPS).

In operation, the client 930 requests sends a DNS request 931 to the authoritative server 920a as part of a process of accessing content stored on one of the content origins 910. The authoritative server 920a responds to this request by selecting a content origin with the desired performance based on the client's IP address and performance rankings of the content origins' performance for providing data to other clients (not shown) with IP addresses on the same subnet or in the same geographic region as the client. This ranking may be tailored specifically to authoritative server 920a. The authoritative server 920a provides the IP address or host name 921 of the selected content origin (e.g., content origin 910a) to the client 930. The client 930 downloads the content 911 from the selected content origin 910, generating additional performance data for resolving future DNS requests. Relevant requests from the client 930 are sent via the recursive resolver 920b.

Collecting RUM Data

Figures 10, 11:
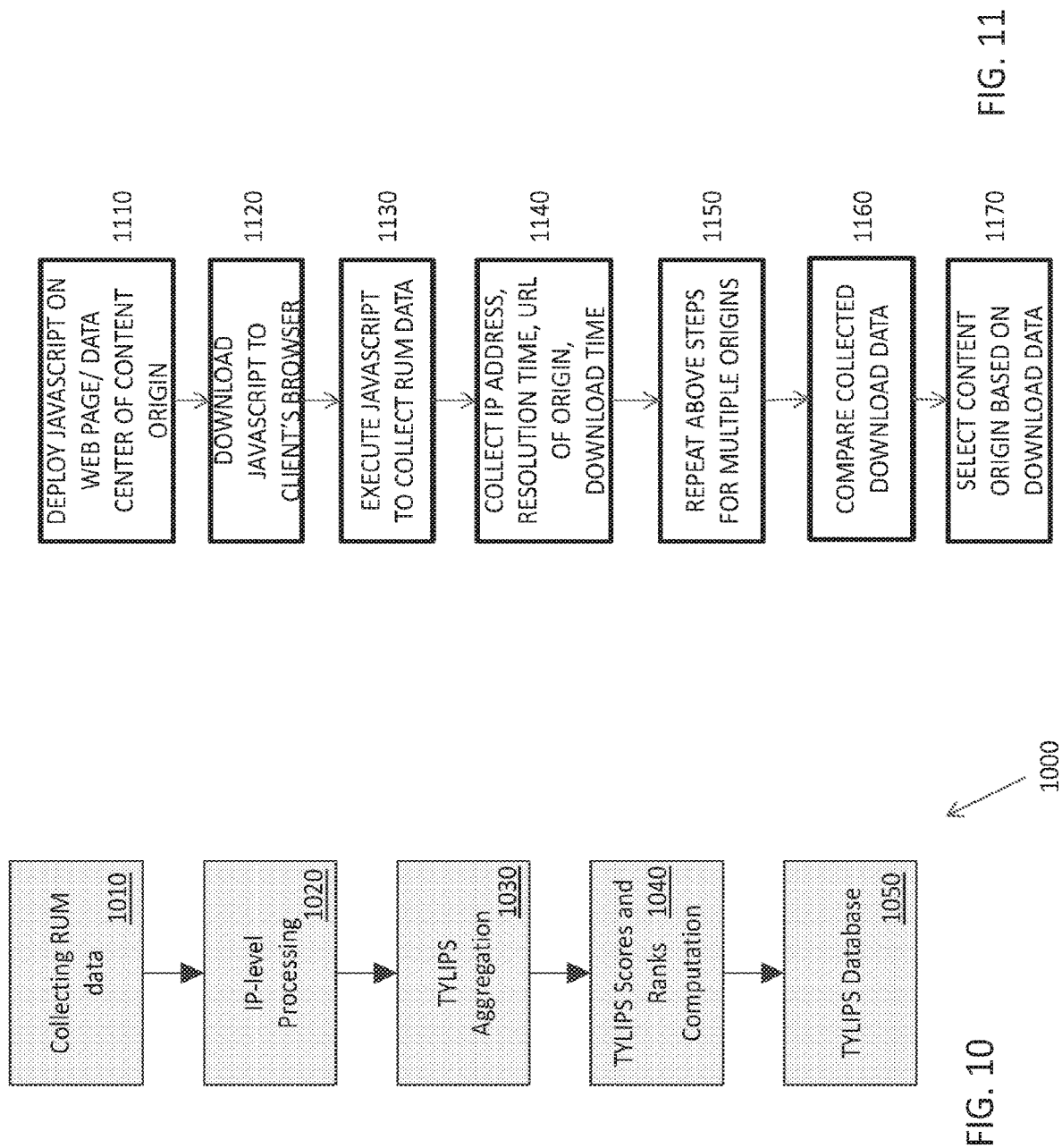
FIGS. 10 and 11 show processes for collecting and aggregating RUM data.

FIG. 10 is a flow diagram that illustrates a process 1000 for creating a database of RUM data to steer traffic using the system 900 shown in FIG. 9. In step 1010, internet performance data is collected as a stream of real-user monitoring (RUM) records. Data is collected from users or clients that request or download data from a plurality of content providers or content origins. Each RUM record is processed in step 1020 by measuring the download times of the same data sample from various content origins nearly simultaneously. Processing allows for direct comparison of each pair of content origins.

In step 1030, the IP addresses are grouped in Typed Labeled IP Sets (TYLIPS). TYLIPS are sets of IP addresses that share a common feature, such as the same country, originated by the same provider etc. Histograms of relative content origin performance are accumulated for each IP address. These histograms are then combined and accumulated for TYLIPS.

For each TYLIPS, timings, failures and other information from recent RUM data are used to compute a performance score in step 1040. These scores are used to rank the content origins for the IP addresses belonging to that TYLIPS. Content origins and their associated TYLIPs ranking are stored in the TYLIPs database. This database provides fast access to aggregated data and is used to steer traffic in an optimal manner.

Internet performance data can be collected, for example, from users or clients who request and download data from a plurality of content providers or content origins. The data is organized in records and each RUM record can be associated with downloads from a user to a plurality of content origins and, contain one or more of the following: (1) client's Internet Protocol (IP) address, (2) IP address(es) of one or more recursive resolvers used for DNS resolution, (3) an identifier uniquely associated with the content origin, for example, Uniform Resource Identifier (URI), and (4) temporal data associated with the download. A content origin can be, for example, a content delivery network (CDN), such as Akamai, Level 3, a cloud provider, such as Digital Ocean, Amazon, or a content publisher's private data center. The temporal data associated with a download can include various intermediate measures of download speed such as time of Domain Name Server (DNS) resolution, time to establish a connection, time to first byte, time to last byte, total duration to download a data sample from a particular content origin etc.

FIG. 11 illustrates another process 1100 for collecting a stream of real-user monitoring (RUM) records. In step 1110 a code such as JavaScript is deployed to download RUM data. In some embodiments, the code is deployed via the webpage of the content origins. In other embodiments, the code is deployed in the datacenter of the content origins. When the client visits the content origins' webpage, the deployed code is downloaded on the client's browser (step 1120). In step 1130, the client executes this code to collect RUM data. In step 1140, the client sends RUM data, including but not limited to the client and content origin IP addresses, DNS request resolution time, URL of the content origin, and download time for each download, to the RUM database. This client may repeat data collection and transmission for downloads from different content origins, multiple downloads from the same content origin, or both in simultaneous and/or sequential measurements in quick succession (step 1150). Comparing the DNS request resolution times and download times for different IP addresses yields rankings associated with different combinations of clients, recursive resolvers, and/or content origins (step 1160). These rankings may be used to respond to further DNS requests, e.g., to reduce the total time or the time associated with one or more steps of the content origin identification and content download process (step 1170).

The operation of code used to collect RUM records is illustrated with reference to the following non-limiting example. A client visits the web page for US Patent Full Page Images http://patft.uspto.gov/netahtml/PTO/patimg.htm via a web browser. The web page provides the JavaScript code which is downloaded by the client's browser. In this example, while the client downloads from the web page a full-page image of a US patent, the JavaScript code executes on the web browser and collects RUM data. The JavaScript code can collect (1) the IP address of the client that visited the web page for US Patent Full Page Images, (2) the IP address of the DNS recursive resolver used by the client, (3) the URI of the content origin for the data sample, and (4) various intermediate times of the process of downloading the data sample.

RUM Data Processing

In each RUM record, the download times of the same data sample from the various origins are measured nearly simultaneously. This allows for a direct performance comparison of each pair of content origins. For each pair of content origins, the difference between corresponding download timings of the same data sample is computed, for example, differences between DNS resolution times and/or connection times. These differences are accumulated over a period of time. Histograms of these differences are computed for each pair of origins and each type of timing. Some examples of timing are DNS resolution or download time.

For example, a client with an IP address geolocated in Houston, Tex., and using a recursive resolver with an IP address geolocated in Dallas, Tex., may see DNS resolution and download times of 10 ms and 40 ms from OID1, and 15 ms and 50 ms, from OID2, respectively. In this example, the differences for the pair (OID1, OID2) are −5 ms for DNS resolution and −10 ms for download time. These differences, accumulated over time, can be used to create histograms indexed jointly by the client or recursive IP, or a feature of these IPs (e.g., geolocation, Internet Service Provider), timing type (e.g., DNS resolution, download time), and origin pair.

Figure 12:
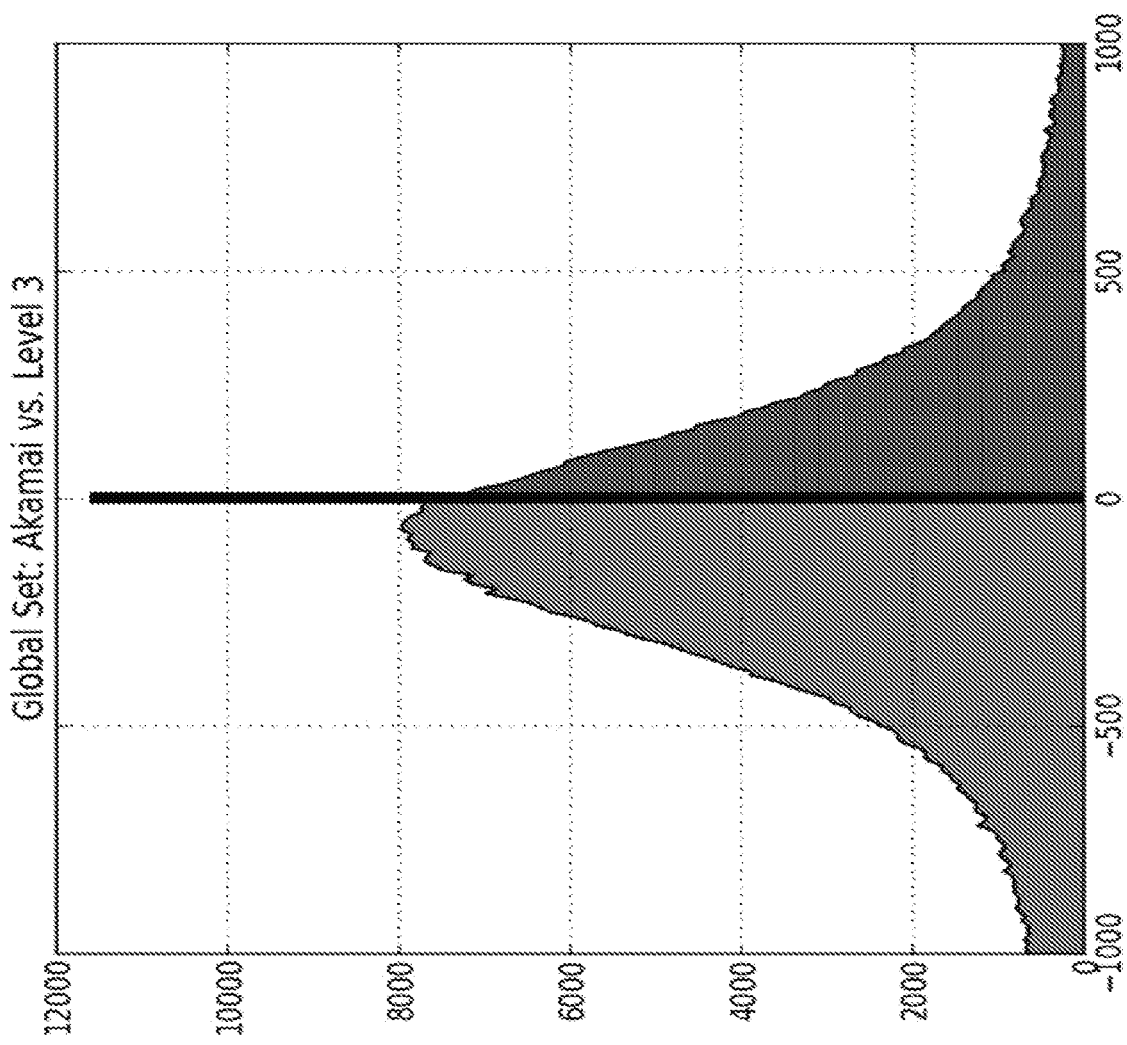
FIG. 12 shows a histogram formed by aggregating RUM data according to the processes shown in FIGS. 10 and 11.

FIG. 12 shows an example histogram for all client IPs in Houston, Tex., from differences of DNS resolution times for content origins in two different content delivery networks (CDNs)—here, Akamai and Fastly—collected over 24 hours. The histograms of differences between origin pairs are used to compare the performance of one origin relative to the other. In some instances, including FIG. 12, this comparison is achieved by counting how many positive and negative values occur in each histogram of differences. For example on a histogram of differences for a pair of origins (OID1, OID2), the negative values represent situations when the timing for OID1 was lower than the timing for OID2, so OID1's performance was better. The positive values represent the opposite situation when OID2's performance was better. If the difference was zero, then the performance of OID1 and OID2 was identical. The performance can also be considered to be equivalent if the absolute difference of timings was below a given threshold, for example, if the absolute difference of the timings is under 20 ms. For each origin, the head-to-head comparisons of performance against the other origins in a cohort can be averaged to produce a single score representative of overall performance of a particular origin. To score each origin relative to the others, other measures specific to an origin such as median latency, variability and/or stability of latencies over time, failure rates, etc. are used.

TYped Labeled IP Sets (TYLIPS) Data Aggregation

RUM data is aggregated over groups of IP addresses sharing one or more common features. These sets are referred to as TYped Labeled IP Sets, or "TYLIPS". Some examples of TYLIPS are: France (type=country), Boston (type=city), AS174 (type=Internet Service Provider (ISP)), and (Paris, AS5511) (type=city-provider). The term "TYLIPS" can also be used interchangeably with the term "IP feature". A single IP is a TYLIPS of size one. Because TYLIPS are sets of IP addresses, they allow the use of mathematical set operations and have all the properties of sets. For example, two TYLIPS may intersect, or one TYLIPS may be contained in another, larger TYLIPS.

Figure 13:
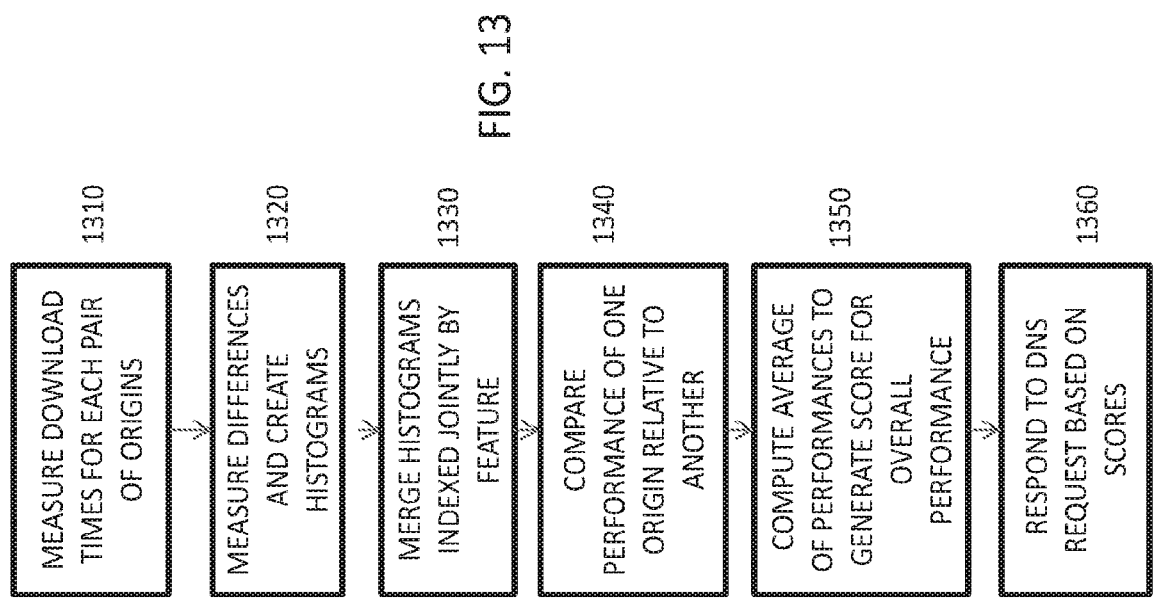
FIG. 13 shows a process for generating histograms like the one shown in FIG. 12.

FIG. 13 is a flow diagram illustrating the process for aggregating RUM data. In step 1310, the download time for each pair of origins is measured almost simultaneously. These differences are accumulated over a period of time. In step 1320, the difference for each pair of origin is computed for the accumulated period of time and histograms are generated.

These histograms of relative origin performance can be built either on a "per client IP address" basis or on a "per recursive resolver IP address" basis. Histograms are accumulated for each IP address and are combined and accumulated to produce histograms for groups of IP addresses (step 1330). Each group of IP addresses is chosen based on all IP addresses from the group sharing one or more common features. The common feature can be, for example, geography (IP addresses from the group are geolocated to a particular city, country, or continent), origination by or transit through a particular Internet Service Provider (ISP), or membership in a common organization. The common feature can also be a joint feature, such as geography and ISP (e.g., IP addresses originated by TeliaSonera in Helsinki).

In step 1340, the performance of one origin relative to another within the same TYLIPS is compared. The TYLIPS are ranked based on their performance and overall score (step 1350). A recursive resolver can use the TYLIPs rankings to select a particular content origin for a particular client in response to a subsequent DNS request (step 1360).

In the context of optimal steering of Internet traffic using RUM data, it is likely for some IP addresses to have data that is incomplete or of unsuitable quality. If complete data were available, decisions for each IP address can be made using data associated with that IP address. To address the issues of data quality or data sparsity in practice, the RUM data is aggregated into TYLIPS and a hierarchy of TYLIPS is defined. A given IP is contained by several, successively larger TYLIPS in the hierarchy. The TYLIPS are ranked based on their degrees of specificity, the amount of data available, the quality of data collected, and other similar criteria. When data for an IP is not available, the most specific TYLIPS, for example, the smallest, for which enough data of sufficient quality is available and is used. The underlying assumption is that the performance profile of the given IP is similar to the performance profile of the IPs in the most specific TYLIPS.

Figure 14B:
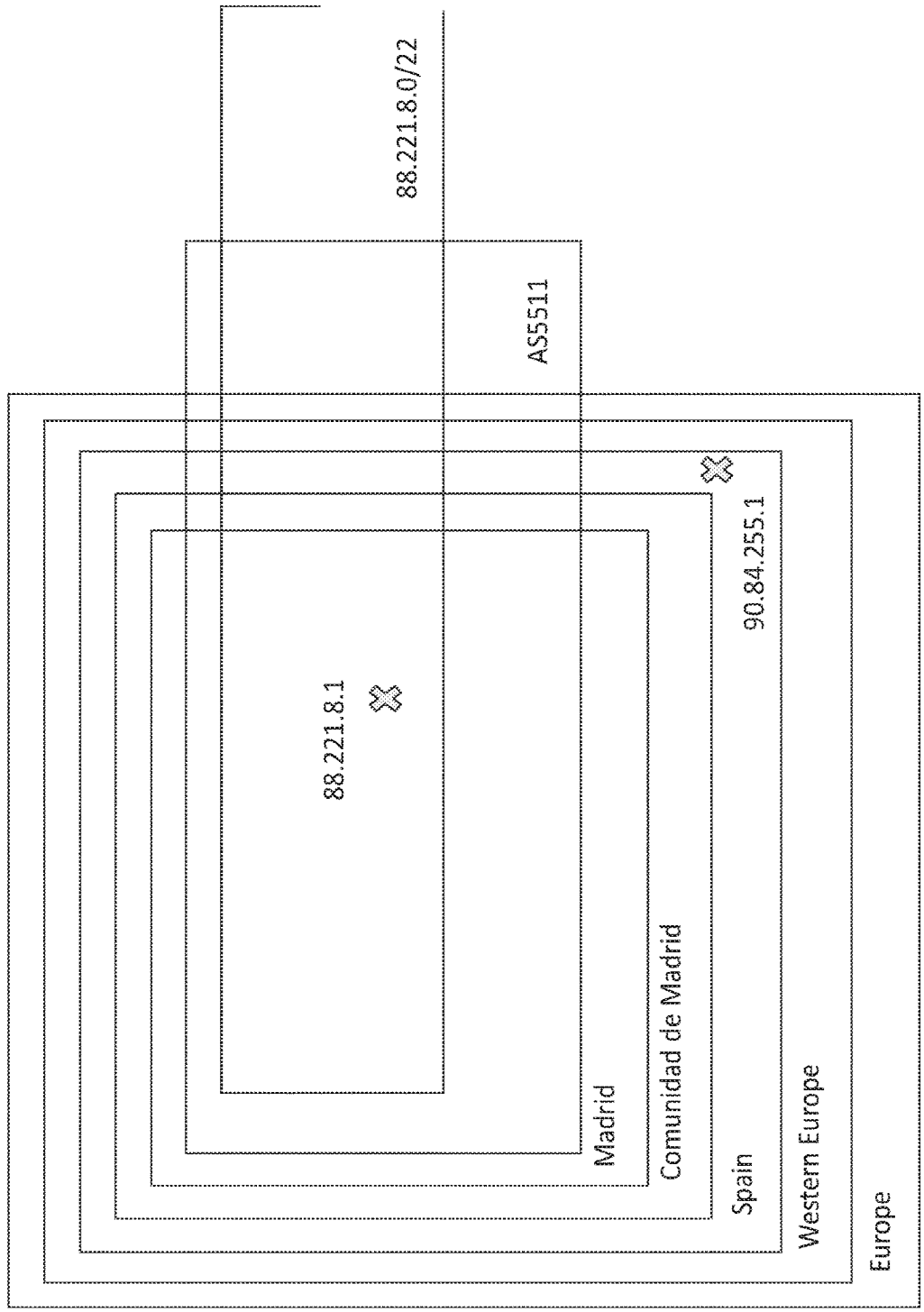

FIGS. 14A and 14B show different hierarchies of TYLIPS. In FIG. 14A, based on the hierarchy of TYLIPS sets, for IP1 the TYLIPS "Network Prefix" is chosen. For IP2 the TYLIPS chosen is the "BGP ASN" in an "Administrative Division," for example, an ISP in a US state. While, for IP3 the TYLIPS chosen is the "Country." In FIG. 14B, IP address 88.221.8.1 belongs to the following TYLIPS hierarchy, which may or may not be predefined: prefix 88.221.8.0/22, AS5511, city of Madrid, province Comunidad de Madrid, country Spain, region Western Europe, and continent Europe. If a request came for this IP address, the most specific TYLIPS with enough data is selected.

Some TYLIPS are contained in other TYLIPS, for instance, city in province, province in country, while some TYLIPS only intersect, for instance, prefix and country. For another IP address, say, 90.84.255.1, the most specific data available may be only at country level, and its TYLIPS hierarchy is country Spain, region Western Europe, continent Europe.

From the hierarchy, the most specific TYLIPS can be chosen from among the available TYLIPS. The most specific TYLIPS is chosen by selecting the TYLIPS whose performance data best matches the profile of the IP address. Additionally, the most specific TYLIPS is chosen based on enough data available.

Ranking TYLIPs

As described above with respect to collecting RUM data, when a client visits a content origin, the client downloads and executes an image or code deployed in the content origin. This code or image records RUM data, such as download time, the time at which the measurement is made, the location of the client's IP etc. The set of measurements is referred to as set of timing measurements from one client IP to all content origins where the code or image is hosted as a beacon. These beacons are transferred to data processing servers for processing data.

The content origin rankings are computed from RUM data. Data is aggregated over a time interval. For example, data is aggregated over 24 hours. For each beacon in the time interval the timing difference between each pair of content origins is computed.

For instance, if in a beacon the following times for 3 content origins are measured:

CDN_A: 60 ms, CDN_B: 100 ms, CDN_C: 40 ms, CDN_D: 200 ms then the pairwise differences are:

CDN_A-B: −40 ms, CDN_A-C: 20 ms, CDN_A-D: −140 ms

CDN_B-C: 60 ms, CDN_B-D: −100 ms

CDN_C-D: −160 ms

Over the time interval the distribution of time differences for each pair of content origins is computed. This allows for computing the average difference or for identifying the percent of time one content origin is better than another.

Several rankings can be computed from pairwise content origin statistics. For instance, an illustration of ranking based on "percent of time better" is disclosed. For a given content origin, the percent of the time the content origin is better when compared to its competitors is identified. Then the percentages are averaged to compute a score. These scores are used to rank the content origins and group content origins with a similar score into grades. This is best illustrated with an example. For the pairwise comparisons of four content origins, the following percentages show when one content origin is better than another:

A-B 52%-48%, A-C 75%-25%, A-D 95%-5%

B-C 70%-30% C-D 90%-10

C-D 60%-40%

In tabular form, these rankings are:

| Content Origin | A | B | C | D |
|---|---|---|---|---|
| A | — | 52% | 75% | 95% |
| B | 48% | — | 70% | 90% |
| C | 25% | 30% | — | 60% |
| D | 5% | 10% | 40% | — |

In this example, the content origin A is the best, but it's almost the same as content origin B, while being significantly better than content origin C, and a lot better than content origin D, which is the worst of all.

Content origin A is better compared to content origins B, C, and D, 52%, 75%, and 95% of the time, respectively. The average of the percentages is 74%. The average percentages of content origins B, C, and D are 69.33%, 38.33%, and 18.33% respectively Using these averages the content origins are ranked as follows:

| CDN | Score | Rank |
|---|---|---|
| A | 74.00% | 1 |
| B | 69.33% | 2 |
| C | 38.33% | 3 |
| D | 18.33% | 4 |

FIG. 15 illustrates an exemplary example of rankings for client IP addresses in Japan for data between Mar. 2, 2016 0:00 UTC and Mar. 3, 2016 0:00 UTC. The rankings along with the scores are illustrated in 1510. The percentage matrix 1520, is a matrix with the percentage better for each content origin on the rows. For instance, Fastly is better than Edgecast about 54% of the time. Not all pairs of percentages add to 100%. This is because a percentage of the measurements were identical, i.e., both content origins had identical performance. The content origins with similar performance are grouped into grades. For example, in grade A the largest score difference between a pair of content origins is less than 10.

To group content origins into grades, the scores are considered in decreasing order. Initially, highest grade for instance A or 0 is considered. For a given score with a grade, the gaps to the previous and next scores are computed in the order. Additionally, the gap between the score and the top score within the same grade is computed. Advance to the next grade if the score difference is strictly greater than two and if: (1) the gap between current score and next score is greater than 10%, i.e., the next score is less than 90% the current score or (2) the gap between the next score and the top grade score is greater than 10% (the next score smaller than 90% of the top grade score) and the gap between next score and current score is greater than three times the gap between previous score and current score.

For example, break between 50 and 40 because the difference between them is 10, which is greater than 2, and 40 is less than 90% of 50, which is 45. Similarly, for scores 60, 57, 55, 53, 51, 50, 46, break between 50 and 46 because 50−46=4>2, 46<(0.9×60)=54, and 50−46=4>3×(51−50)=1.

If the difference between current grade and next grade is greater than 20% advance the grade by more than one step as follows: (1) for differences between 10% and 20% advance one grade, e.g., A to B; (2) for differences between 20% and 40% advance two grades, e.g., A to C; (3) for differences between 40% and 80% advance three grades, e.g., A to D; and (4) for differences more than 80% advance to F.

Therefore, similar scores get the same grade. A grade break is applied between scores with a significant difference (10%). The grade breaks are such that the top score and bottom score within a grade are not too different.

Steering Traffic Using RUM Data Aggregated over TYLIPS

Figure 16:
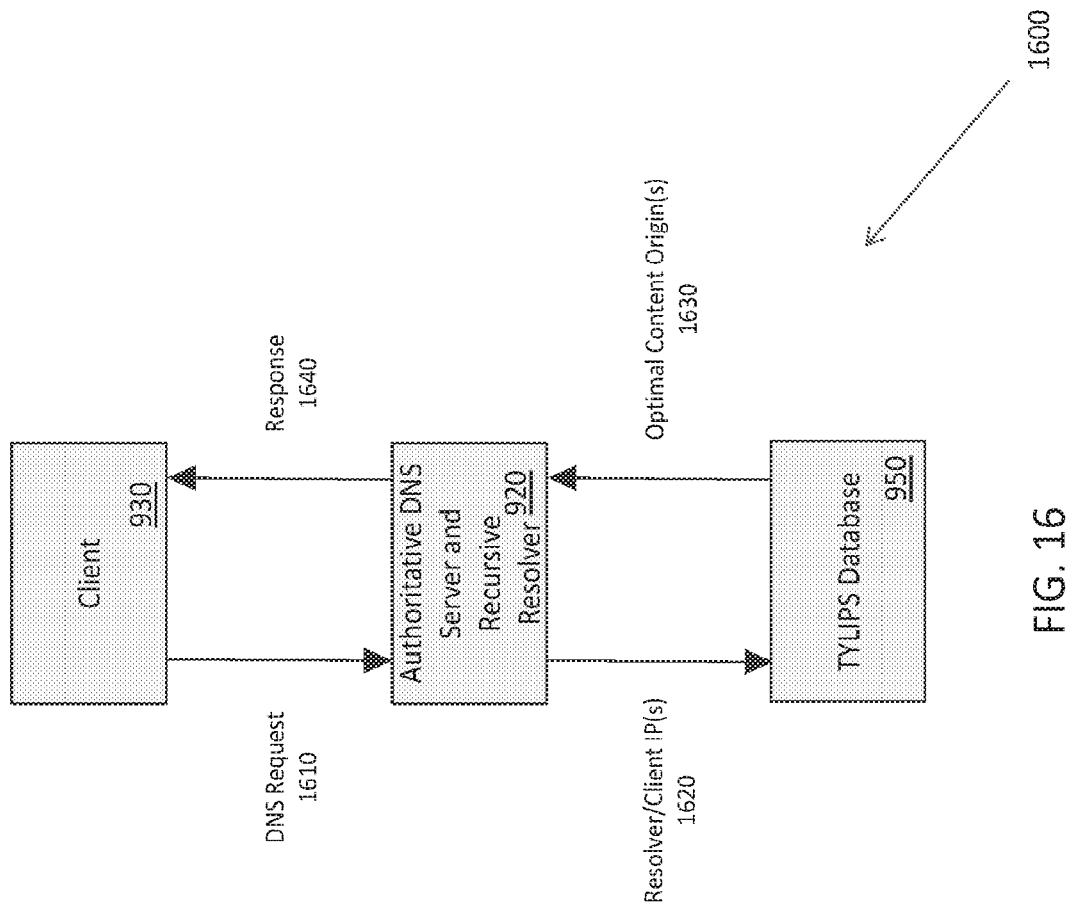
FIG. 16 shows a process for steering traffic based on RUM data.

FIG. 16 illustrates a process 1005 for steering traffic using RUM data aggregated over one or more TYLIPS. The client 930 sends a DNS request to the recursive resolver 920b to resolve domain to an IP address, and the recursive resolver forwards the DNS request to the authoritative DNS server 920a (step 1610). The authoritative DNS server and recursive resolver 920 provide the IP address of the client's DNS recursive resolver and the client's IP address, if available, (step 1620) to the TYLIPS database 950, which retrieves the most specific available TYLIPS associated with the client's DNS recursive resolver's and client's IP addresses. The TYLIPS database 950 also retrieves the corresponding rankings of the content origins for the most specific available TYLIPs and selects a content origin(s) based on the rankings. The TYLIPs database 950 provides the selected content origin 1630 to the authoritative DNS server 920a and recursive resolver 920b, which respond to the client's DNS request by sending the IP address of the optimal content origin(s) to the client 930.

Based on the RUM data, the recursive resolver's IP address can be associated with TYLIPS of the client's IP address. If the recursive resolver's IP address is not observed in the RUM data, then the recursive resolver's IP address may be used to find the hierarchy of TYLIPS. Client subnet data, such as the client's prefix, may also be used to find the hierarchy of TYLIPS.

A recursive resolver IP address can be associated with a hierarchy of IP features, or TYLIPS, belonging to the client IP addresses represented by the recursive resolver IP address. For example, a recursive resolver can make queries to an authoritative DNS server on behalf of clients in a range of cities on the East Coast of the United States. In other instances, one or more features of the recursive resolver IP address can be used directly as the basis for steering. For example, the recursive resolver may be geolocated to Boston Regardless, a set of TYLIPS associated with the query from the recursive resolver is selected, and this selected set of TYLIPS is used in the steering decision.

Take, for example, a recursive resolver geolocated in Somerville, Mass., and originated by Comcast. If there are enough RUM records associated with this recursive resolver's IP address to discriminate between multiple origin candidates and select a proper origin, the ranking specifically associated with the recursive resolver's IP address can be used. Otherwise, the origin ranking associated with a region of lesser specificity (e.g., the city of Somerville, the state of Massachusetts, or the region of New England) having sufficient RUM records to form the basis for discrimination can be used. It is often desirable to use the most specific feature or joint feature for which there is enough data of good quality to allow a clear recommendation for the proper origin to be made. In other words, the most specific TYLIPS for which there is enough data is selected, and the content origin with the best score for the most specific TYLIPS is recommended. Data can be quantified as enough by providing a threshold for desirable quantity of RUM data and analyzing if the current quantity is greater than the threshold.

For example, a content provider (e.g., the New York Times) may pay an authoritative DNS provider to steer users to www.nytimes.com to a proper content origin among multiple content origins (e.g., origin located in Europe and North America). The authoritative DNS provider collects RUM records (e.g., using the methods discussed above), compares performance of www.nytimes.com based on user locations, and provides a recommendation for a content origin. For example, the authoritative DNS provider may recommend Europe rather than North America.

An authoritative DNS provider for a given zone provides real-time traffic steering so that one or more users represented by a querying recursive DNS resolver are mapped to an origin for the requested content. The origin can be chosen based on low latency, high availability, stability, and other similar properties. In other words, the authoritative DNS provider can refer the recursive resolver requesting a domain to the most desirable location to get data for that domain.

Thus, a process to compute from a recursive IP and/or client IP a hierarchy of TYLIPS is disclosed. For each TYLIPS access to a database with precomputed scores and ranks of content origins is available. The best TYLIPS is selected, for example, the most specific TYLIPS for which there is enough data. The scores and ranks of the best TYLIPS are used to match the domain requested by the recursive IP with the content origin(s) with the best score(s).

Embodiments of the present invention can be used to steer traffic in real-time, or to configure a DNS in such a way that it would achieve a desirable level of performance based on past performance. Using the methods of the present invention, a map can be generated that matches geographies to desirable CDNs. For example, a proper content origin can be recommended for queries originating from Massachusetts, even if the user does not currently purchase CDN services from that content origin. Embodiments of the present invention can therefore be used to evaluate new CDN service purchases.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software, or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the technology disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B): in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of directing traffic from a customer premises to an Internet Protocol (IP) address among a plurality of transit providers, the method comprising:
measuring a first latency on a first path from a collector device at the customer premises to the IP address, wherein the first path comprises a first transit provider in the plurality of transit providers and a first border router coupled to the first transit provider;
measuring a second latency on a second path from the collector device to the IP address, wherein the second path comprises a second transit provider in the plurality of transit providers, a second border router, and the first border router;
performing a comparison of the first latency and the second latency;
selecting the second transit provider based on the comparison of the first latency and the second latency; and
directing traffic from the customer premises to the IP address, wherein directing the traffic to the IP address comprises directing the traffic to the second transit provider on the second path via the first border router and the second border router.

2. The method of claim 1, wherein measuring the first latency comprises: transmitting an echo request to the IP address via the first transit provider; and receiving an echo reply via the second transit provider.

3. The method of claim 1, wherein measuring the first latency comprises:
transmitting an echo request to the IP address via a first interface of a border router coupled to the first transit provider; and
receiving an echo reply via a second interface of the border router.

4. The method of claim 1, wherein performing the comparison of the first latency and the second latency comprises:
comparing an inbound latency of the first transit provider to an inbound latency of the second transit provider; and
comparing an outbound latency of the first transit provider to an outbound latency of the second transit provider.

5. The method of claim 1, wherein selecting the one of the first transit provider and the second transit provider further comprises:
selecting the one of the first transit provider and the second transit provider based on a cost of the first transit provider and a cost of the second transit provider.

6. The method of claim 1, wherein selecting the one of the first transit provider and the second transit provider further comprises:
selecting the one of the first transit provider and the second transit provider based on a packet loss of the first transit provider and a packet loss of the second transit provider.

7. The method of claim 1, wherein directing the traffic to the IP address comprises: associating a host prefix of a packet with a Border Gateway Protocol (BGP) community attribute; and
directing the packet to the one of the first transit provider and the second transit provider based on the BGP community attribute of the host prefix.

8. The method of claim 1, wherein directing the traffic to the IP address comprises:
setting a next hop for traffic destined to the IP address to be a border router coupled to the one of the first transit provider and the second transit provider.

9. A method of directing traffic from a customer premises to an Internet Protocol (IP) address among a plurality of transit providers, the method comprising:
measuring a first latency on a first path from a collector device at the customer premises to the IP address, wherein the first path comprises a first transit provider in the plurality of transit providers and a first interface on a border router coupled to the first transit provider and the second transit provider;
measuring a second latency on a second path from the collector device to the IP address, wherein the second path comprises a second transit provider in the plurality of transit providers and a second interface on the border router;

performing a comparison of the first latency and the second latency;

selecting the second transit provider based on the comparison of the first latency and the second latency; and directing traffic from the customer premises to the IP address via the second transit provider, wherein directing the traffic to the IP address comprises directing the traffic to the second transit provider via the second interface on the border router.

10. A non-transitory computer readable medium storing instructions which, when executed by one or more hardware processors, cause performance of operations for directing traffic from a customer premises to an Internet Protocol (IP) address among a plurality of transit providers, the operations comprising:

measuring a first latency on a first path from a collector device at the customer premises to the IP address, wherein the first path comprises a first transit provider in the plurality of transit providers and a first border router coupled to the first transit provider;

measuring a second latency on a second path from the collector device to the IP address, wherein the second path comprises a second transit provider in the plurality of transit providers, a second border router, and the first border router;

performing a comparison of the first latency and the second latency;

selecting the second transit provider based on the comparison of the first latency and the second latency; and directing traffic from the customer premises to the IP address, wherein directing the traffic to the IP address comprises directing the traffic to the second transit provider on the second path via the first border router and the second border router.

11. The medium of claim 10, wherein the operations for measuring the first latency further comprise:

transmitting an echo request to the IP address via the first transit provider; and receiving an echo reply via the second transit provider.

12. The medium of claim 10, wherein the operations for measuring the first latency further comprise:

transmitting an echo request to the IP address via a first interface of a border router coupled to the first transit provider; and receiving an echo reply via a second interface of the border router.

13. The medium of claim 10, wherein the operations for performing the comparison of the first latency and the second latency further comprise:

comparing an inbound latency of the first transit provider to an inbound latency of the second transit provider; and comparing an outbound latency of the first transit provider to an outbound latency of the second transit provider.

14. The medium of claim 10, wherein the operations for selecting the one of the first transit provider and the second transit provider further comprise:

selecting the one of the first transit provider and the second transit provider based on a cost of the first transit provider and a cost of the second transit provider.

15. The medium of claim 10, wherein the operations for selecting the one of the first transit provider and the second transit provider further comprise:

selecting the one of the first transit provider and the second transit provider based on a packet loss of the first transit provider and a packet loss of the second transit provider.

16. The medium of claim 10, wherein the operations for directing the traffic to the IP address further comprise: associating a host prefix of a packet with a Border Gateway Protocol (BGP) community attribute; and directing the packet to the one of the first transit provider and the second transit provider based on the BGP community attribute of the host prefix.

17. The medium of claim 10, wherein the operations for directing the traffic to the IP address further comprise:

setting a next hop for traffic destined to the IP address to be a border router coupled to the one of the first transit provider and the second transit provider.

18. A non-transitory computer readable medium storing instructions which, when executed by one or more hardware processors, cause performance of operations for directing traffic from a customer premises to an Internet Protocol (IP) address among a plurality of transit providers, the operations comprising:

measuring a first latency on a first path from a collector device at the customer premises to the IP address, wherein the first path comprises a first transit provider in the plurality of transit providers and a first interface on a border router coupled to the first transit provider and the second transit provider;

measuring a second latency on a second path from the collector device to the IP address, wherein the second path comprises a second transit provider in the plurality of transit providers and a second interface on the border router;

performing a comparison of the first latency and the second latency;

selecting the second transit provider based on the comparison of the first latency and the second latency; and directing traffic from the customer premises to the IP address via the second transit provider, wherein directing the traffic to the IP address comprises directing the traffic to the second transit provider via the second interface on the border router.

19. A system, comprising:

at least one device including a hardware processor; and the system being configured to perform operations for directing traffic from a customer premises to an Internet Protocol (IP) address among a plurality of transit providers, the operations comprising:

measuring a first latency on a first path from a collector device at the customer premises to the IP address, wherein the first path comprises a first transit provider in the plurality of transit providers and a first border router coupled to the first transit provider;

measuring a second latency on a second path from the collector device to the IP address, wherein the second path comprises a second transit provider in the plurality of transit providers, a second border router, and the first border router;

performing a comparison of the first latency and the second latency;

selecting the second transit provider based on the comparison of the first latency and the second latency; and directing traffic from the customer premises to the IP address, wherein directing the traffic to the IP address comprises directing the traffic to the second transit provider on the second path via the first border router and the second border router.

20. A system, comprising:

at least one device including a hardware processor; and the system being configured to perform operations for directing traffic from a customer premises to an Internet Protocol (IP) address among a plurality of transit providers, the operations comprising:

measuring a first latency on a first path from a collector device at the customer premises to the IP address, wherein the first path comprises a first transit provider in the plurality of transit providers and a first interface on a border router coupled to the first transit provider and the second transit provider;

measuring a second latency on a second path from the collector device to the IP address, wherein the second path comprises a second transit provider in the plurality of transit providers and a second interface on the border router;

performing a comparison of the first latency and the second latency;

selecting the second transit provider based on the comparison of the first latency and the second latency; and directing traffic from the customer premises to the IP address via the second transit provider, wherein directing the traffic to the IP address comprises directing the traffic to the second transit provider via the second interface on the border router.

\* \* \* \* \*